United States Patent
Sugiyama et al.

(10) Patent No.: US 12,093,030 B2
(45) Date of Patent: Sep. 17, 2024

(54) CONTROL SYSTEM, SUPPORT DEVICE, AND STORAGE MEDIUM TO ALLOW DETERMINATION WHETHER SPECIFICATIONS OF SAFETY FUNCTIONS ARE SATISFIED

(71) Applicant: OMRON Corporation, Kyoto (JP)

(72) Inventors: Asuka Sugiyama, Kyoto (JP); Daisuke Tamashima, Kusatsu (JP); Yuji Suzuki, Kusatsu (JP); Fumiaki Sato, Kyoto (JP)

(73) Assignee: OMRON Corporation, Kyoto (JP)

( * ) Notice: Subject to any disclaimer, the term of this patent is extended or adjusted under 35 U.S.C. 154(b) by 163 days.

(21) Appl. No.: 17/269,522

(22) PCT Filed: Sep. 26, 2019

(86) PCT No.: PCT/JP2019/037852
§ 371 (c)(1),
(2) Date: Feb. 18, 2021

(87) PCT Pub. No.: WO2020/067286
PCT Pub. Date: Apr. 2, 2020

(65) Prior Publication Data
US 2021/0216047 A1    Jul. 15, 2021

(30) Foreign Application Priority Data
Sep. 28, 2018    (JP) .................. 2018-183830

(51) Int. Cl.
*G05B 9/02*        (2006.01)
*G05B 19/042*      (2006.01)
(Continued)

(52) U.S. Cl.
CPC ........... *G05B 9/02* (2013.01); *G05B 23/0264* (2013.01); *G05B 23/0286* (2013.01);
(Continued)

(58) Field of Classification Search
None
See application file for complete search history.

(56) References Cited

U.S. PATENT DOCUMENTS

2011/0221377 A1* 9/2011 Ueno ............... G05B 9/02
318/565
2011/0241447 A1* 10/2011 Ando ............ G05B 19/4063
307/326

(Continued)

FOREIGN PATENT DOCUMENTS

CN    102957379    3/2013
CN    202813802    3/2013
(Continued)

OTHER PUBLICATIONS

"Search Report of Europe Counterpart Application", issued on May 27, 2022, p. 1-p. 13.
(Continued)

*Primary Examiner* — Kenneth M Lo
*Assistant Examiner* — Istiaque Ahmed
(74) *Attorney, Agent, or Firm* — JCIPRNET

(57) ABSTRACT

Provided is a control system that outputs determination information on whether or not safety function specifications are satisfied. The control system includes: first and second controllers (100, 200); a drive device (300); and a data tracing module (154) that traces a state value indicating an operation state of a motor (400). The drive device (300) includes: a storage for storing safety parameters related to safety functions; and a control device (311) that stops driving of the motor (400) on the basis of the safety parameters and the state value indicating the operation state of the motor (400). The control system further includes: a support device (500) that displays the safety parameters (Continued)

while overlapping a tracing result of the state value obtained by the data tracing module (154).

8 Claims, 22 Drawing Sheets

(51) Int. Cl.
*G05B 19/05* (2006.01)
*G05B 23/02* (2006.01)
*G06F 16/901* (2019.01)

(52) U.S. Cl.
CPC ...... *G06F 16/9024* (2019.01); *G05B 19/0428* (2013.01); *G05B 19/058* (2013.01)

(56) References Cited

U.S. PATENT DOCUMENTS

| | | | |
|---|---|---|---|
| 2013/0241460 A1* | 9/2013 | Ushiyama | G05B 19/4062 318/565 |
| 2014/0018958 A1* | 1/2014 | Ueno | G05B 19/406 700/255 |

FOREIGN PATENT DOCUMENTS

| | | |
|---|---|---|
| CN | 107562004 | 1/2018 |
| CN | 108572609 | 9/2018 |
| DE | 112013006837 | 12/2015 |
| EP | 3264210 | 1/2018 |
| JP | 2009146040 | 7/2009 |
| JP | 2017079009 | 4/2017 |
| JP | 2018005453 | 1/2018 |
| WO | 2005109122 | 11/2005 |

OTHER PUBLICATIONS

IEC 61800-5-2:2016, "Adjustable speed electrical power drive systems-Part 5-2: Safety requirements-Functional", International Standard, International Electrotechnical Commission, Apr. 18, 2015, pp. 1-25.

"International Search Report (Form PCT/ISA/210) of PCT/JP2019/037852", with English translation thereof, mailed on Nov. 12, 2019, pp. 1-2.

"Written Opinion of the International Searching Authority (Form PCT/ISA/237) of PCT/ JP2019/037852", with English translation thereof, mailed on Nov. 12, 2019, pp. 1-6.

Office Action of China Counterpart Application, with English translation thereof, issued on Dec. 6, 2023, pp. 1-23.

\* cited by examiner

390

| STO | STO parameter |
|-----|---------------|
| SS1 | SS1 parameter |
| SS2 | SS2 parameter |
| ⋮   | ⋮             |

CONTROL SYSTEM, SUPPORT DEVICE, AND STORAGE MEDIUM TO ALLOW DETERMINATION WHETHER SPECIFICATIONS OF SAFETY FUNCTIONS ARE SATISFIED

CROSS-REFERENCE TO RELATED APPLICATION

This application is a 371 application of the International PCT application serial no. PCT/JP2019/037852, filed on Sep. 26, 2019, which claims the priority benefits of Japan Patent Application No. 2018-183830, filed on Sep. 28, 2018. The entirety of each of the above-mentioned patent applications is hereby incorporated by reference herein and made a part of this specification.

BACKGROUND

Technical Field

The present invention relates to a control system, and a support device and a support program used in the control system.

Related Art

In many manufacturing sites, safety systems have increasingly been introduced in order to safely use facilities and machines. The safety systems are intended to provide safety functions in accordance with international standards and are configured with safety components such as safety controllers, safety sensors, safety switches, and safety relays.

The safety systems are also required to provide safety functions to drive devices such as servo motors that drive facilities or machines. For example, Non-Patent Literature 1 defines safety functions to be provided to variable speed electric drive systems.

More specifically, Non-Patent Literature 1 defines some safety functions related to drive devices such as Safe Torque Off (STO), Safe Stop 1 (SS1), Safe Stop 2 (SS2), Safe Operating Stop (SOS), and Safe Brake Control (SBC).

As a function for checking whether or not specifications of safety functions disclosed in Non-Patent Literature 1 are satisfied, there is a data tracing function. The data tracing function is a function of monitoring transition of a state value (a speed, for example) related to operations of a servo motor. As literature related to the data tracing function, there are Japanese Patent Application Laid-Open No. 2009-146040 (Patent Literature 1) and Japanese Patent Application Laid-Open No. 2017-79009 (Patent Literature 2).

CITATION LIST

Patent Literature

[Patent Literature 1]
Japanese Patent Application Laid-Open No. 2009-146040
[Patent Literature 2]
Japanese Patent Application Laid-Open No. 2017-79009

Non-Patent Literature

[Non-Patent Literature 1]
"IEC 61800-5-2:2016 Adjustable speed electrical power drive systems-Part 5-2: Safety requirements-Functional", International Electrotechnical Commission, 2016 Apr. 18

SUMMARY

Technical Problem

The data tracing functions disclosed in Patent Literatures 1 and 2 are only for outputting results of tracing data such as a speed of a servo motor, and users cannot immediately determine whether or not specifications of safety functions are satisfied even if the users check the results of tracing data.

The present disclosure was made in order to solve the aforementioned problem, and an objective according to an aspect is to provide a control system capable of outputting information to allow determination related to whether or not specifications of safety functions are satisfied. An objective according to another aspect is to provide a support device capable of outputting information to allow determination related to whether or not specifications of safety functions are satisfied. An objective according to another aspect is to provide a support program capable of outputting information to allow determination related to whether or not specifications of safety functions are satisfied.

Solution to Problem

According to an example of the present disclosure, a control system includes: a first controller; a drive device that drives a motor in accordance with a first command from the first controller; a second controller that transmits a second command related to operations of safety functions to the drive device; and a data tracing module for tracing a state value indicating an operation state of the motor. The drive device includes a storage for storing safety parameters related to the safety functions and a control device for stopping driving of the motor on the basis of the state value and the safety parameters in a case in which the second command is received from the second controller. The control system further includes a support device for acquiring a tracing result of the state value obtained by the data tracing module and displaying the safety parameters with the safety parameters superimposed on the tracing result.

According to the disclosure, a user can easily determine whether or not operations of the drive device satisfy specifications of safety functions by the safety parameters being displayed with the safety parameters superimposed on the tracing result.

In an example of the present disclosure, the support device displays the safety parameters with the safety parameters superimposed on the tracing result after matching a unit of the state value indicated in the tracing result with a unit of the safety parameters.

According to the disclosure, the user can easily compare the state value indicated by the tracing result with the safety parameters.

In an example of the present disclosure, the support device displays the tracing result on a graph in which one of a horizontal axis and a vertical axis represents time while the other one of the horizontal axis and the vertical axis represents a magnitude of the state value, and also displays the safety parameters on the graph.

According to the disclosure, the user can easily analyze the state value indicated by the tracing result and the safety parameters.

In an example of the present disclosure, the safety parameters include a lower limit value of the state value and an upper limit value of the state value. The support device displays the lower limit value and the upper limit value on the graph.

According to the disclosure, the user can easily determine whether or not the state value is within a range of the upper limit value and the lower limit value.

In an example of the present disclosure, the support device displays the lower limit value and the upper limit value on the graph with each of the lower limit value and the upper limit value perpendicularly intersecting the vertical axis.

According to the disclosure, the user can more easily determine whether or not the state value is within the range of the upper limit value and the lower limit value.

In an example of the present disclosure, the safety parameters include a stop holding period starting from when the drive device receives the second command until the driving of the motor is stopped. The support device displays, on the graph, a first timing at which the second command is received and a second timing at which the stop holding period elapses after the first timing.

According to the disclosure, the user can easily check transition of the state value in the stop holding period.

In an example of the present disclosure, the support device displays the first timing and the second timing on the graph with each of the first timing and the second timing perpendicularly intersecting the horizontal axis.

According to the disclosure, the user can more easily check the transition of the state value in the stop holding period.

In another example of the present disclosure, there is provided a support device connected to a control system. The control system includes a first controller, a drive device that drives a motor in accordance with a first command from the first controller, a second controller that transmits a second command related to operations of safety functions to the drive device, and a data tracing module for tracing a state value indicating an operation state of the motor that changes in accordance with the first command. The drive device includes a storage for storing safety parameters related to the safety functions and a control device for stopping driving of the motor on the basis of the state value and the safety parameters in a case in which the second command is received from the second controller. The support device includes a means for acquiring a tracing result of the state value from the data tracing module, a means for acquiring the safety parameters from the drive device, and a means for displaying the acquired safety parameters with the safety parameters superimposed on the acquired tracing result.

According to the disclosure, the user can easily determine whether or not operations of the drive device satisfy the specifications of the safety functions by the safety parameters being displayed with the safety parameters superimposed on the tracing result.

In another example of the present disclosure, there is provided a support program that is executed by a computer connected to a control system. The control system includes a first controller, a drive device that drives a motor in accordance with a first command from the first controller, a second controller that transmits a second command related to operations of safety functions to the drive device, and a data tracing module for tracing a state value indicating an operation state of the motor that changes in accordance with the first command. The drive device includes a storage for storing safety parameters related to the safety functions and a control device for stopping driving of the motor on the basis of the state value and the safety parameters in a case in which the second command is received from the second controller. The support program causes the computer to execute steps of: acquiring a tracing result of the state value from the data tracing module; acquiring the safety parameters from the drive device; and displaying the acquired safety parameters with the safety parameters superimposed on the acquired tracing result.

According to the disclosure, the user can easily determine whether or not operations of the drive device satisfy specifications of safety functions by the safety parameters being displayed with the safety parameters superimposed on the tracing result.

Effects of Invention

According to the present invention, it is possible to output information for allowing determination related to whether or not specifications of safety functions are satisfied.

BRIEF DESCRIPTION OF THE DRAWINGS

FIG. 10 is a diagram illustrating an example of a parameter set for realizing the motion safety functions stored in the safety driver of the control system according to the embodiment.

FIG. 15 is a diagram illustrating a data tracing screen that receives various kinds of setting related to data tracing.

DESCRIPTION OF THE EMBODIMENTS

Hereinafter, each embodiment according to the present invention will be described with reference to drawings. In the following description, the same reference signs will be applied to the same parts and components. The names and the functions thereof will also be the same. Therefore, detailed description thereof will not be repeated. Note that the embodiments and the modification examples described below may selectively be combined in an appropriate manner.

A. Application Example

First, an example of a situation to which the present invention is applied will be described.

Figure 1:
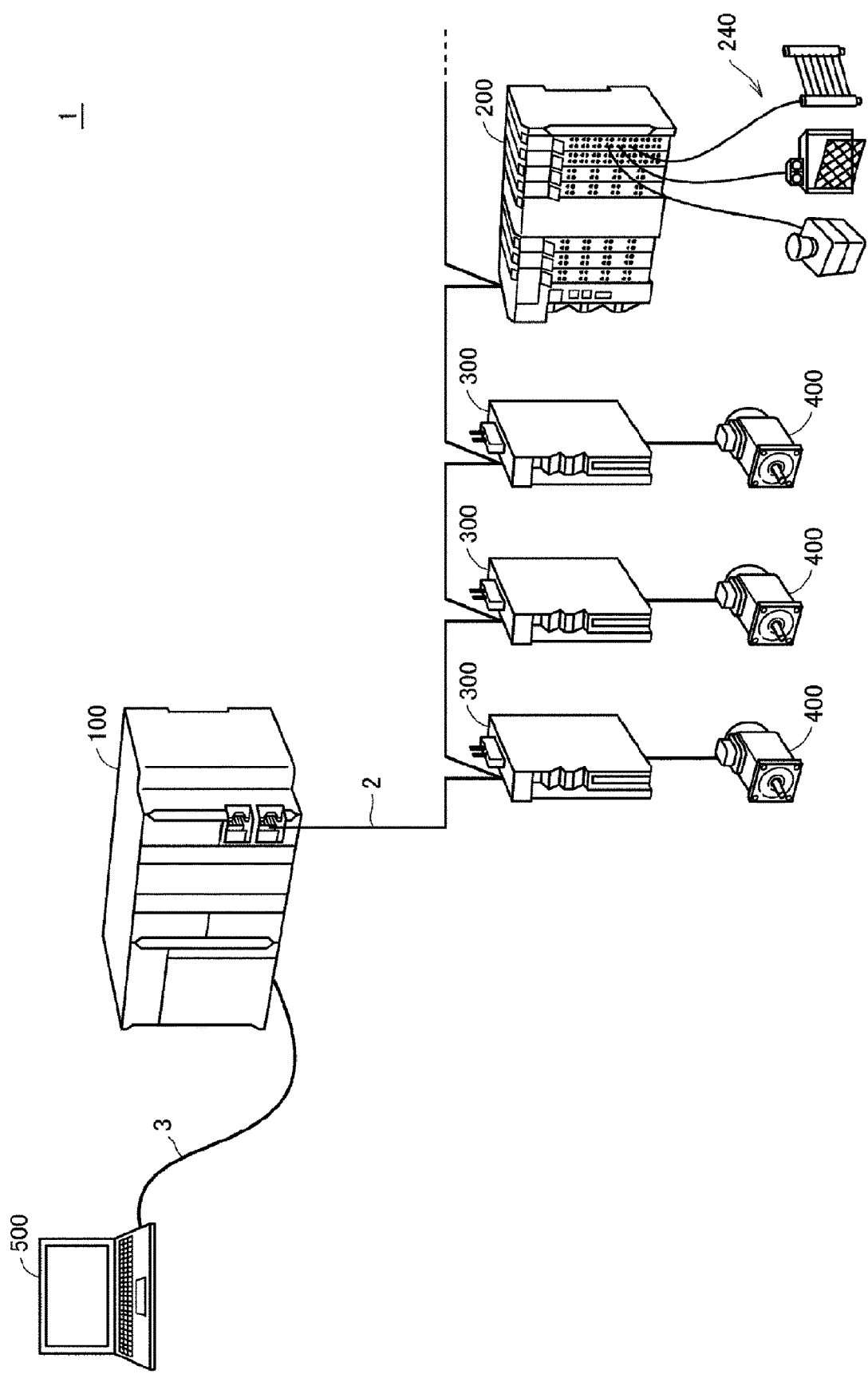
FIG. 1 is a schematic view illustrating a configuration example of a control system according to an embodiment.

FIG. 1 is a schematic view illustrating a configuration example of a control system 1 according to an embodiment. The control system 1 according to the embodiment provides safety functions for drive devices defined by the aforementioned Non-Patent Literature 1 in addition to safety functions defined by IEC 61508 and the like, for example.

Referring to FIG. 1, the control system 1 mainly includes a standard controller 100 and a safety controller 200 and one or a plurality of safety drivers 300 connected to the standard controller 100 via a field network 2. Each of the safety drivers 300 drives an electrically connected servo motor 400. Note that the motor is not limited to the servo motor 400 and an arbitrary type of motor can be employed. Moreover, the control system 1 includes a support device 500 connected to the standard controller 100 via a network 3.

The standard controller 100 corresponds to the first controller and executes standard control on a control target including the servo motor 400 in accordance with a standard control program created in advance. Typically, the standard controller 100 periodically calculates a command for an actuator such as the servo motor 400 through cyclic execution of a control arithmetic operation in accordance with an input signal from one or a plurality of sensors (not illustrated) or the like.

The safety controller 200 transmits a safety command (second command) related to operations of safety functions to the safety drivers 300. More specifically, the safety controller 200 independently performs cyclic execution of monitoring and a control arithmetic operation for realizing the safety functions for the control target independently from the standard controller 100. The safety controller 200 can receive an input signal from an arbitrary safety device 240 and/or output a command to the arbitrary safety device 240.

Each safety driver 300 drives the servo motor 400 by supplying electric power to the servo motor 400 in accordance with a command (first command) from the standard controller 100. The safety driver 300 periodically calculates a rotation position, a rotation speed, a rotation acceleration, a generated torque, and the like of the servo motor 400 on the basis of a feedback signal or the like from the servo motor 400.

Further, the safety driver 300 has safety functions related to driving of the servo motor 400. More specifically, the safety driver 300 provides state information necessary for the safety functions to the safety controller 200 and adjusts or blocks electric power to be supplied to the servo motor 400 in accordance with required safety functions.

The servo motor 400 has a motor that receives electric power from the safety driver 300 and rotates and outputs, to the safety driver 300, a detection signal from an encoder coupled to a rotation shaft of the motor as a feedback signal.

The support device 500 is a computer configured in accordance with a general-purpose computer architecture in one example. The support device 500 provides a development environment in which setting for each device included in the control system 1 and creation of a program executed by each device can be performed in an integrated manner. In one example, the support device 500 provides an environment for developing a standard control program for controlling the standard controller 100 and a safety program for controlling the safety controller 200. The designed standard control program and safety program are transferred to the standard controller 100 and the safety controller 200, respectively, via the field network 2.

In the specification, the "device" is a general term of a device capable of communicating data with another device via an arbitrary network such as the field network 2. In the control system 1 according to the embodiment, the "device" includes the standard controller 100, the safety controller 200, and the safety drivers 300.

In the specification, the terms "standard control" and "safety control" will be used in a comparative manner. The "standard control" is a general term of processing for controlling a control target in accordance with a predefined required specification. On the other hand, the "safety control" is a general term of processing for preventing persons' safety from being threatened by facilities, machines, and the like. The "safety control" is designed to satisfy requirements for realizing safety functions defined by IEC 61508 and the like.

In the specification, safety functions unique to the drive device will collectively be referred to as "motion safety functions". Typically, the "functions" include the safety functions related to the drive device defined by Non-Patent Literature 1 described above. For example, the "functions" include control of monitoring the position and the speed of a control axis and securing safety.

In the specification, the terms "state value" and "parameters" will be used in a comparative manner. The "state value" means data indicating at least one of a state of the standard controller 100, a state of the safety controller 200, a state of each safety driver 300, and a state of the servo motor 400. In other words, the "state value" means data, a value of which changes in conjunction with the state of the standard controller 100, the state of the safety controller 200, the state of each safety driver 300, or the state of the servo motor 400. Typically, the "state value" corresponds to variables used in the standard control program and the safety program and can include data indicating one value, data represented as a sequence, data represented as a structure, and the like. In contrast, the "parameters" mean data that does not change in conjunction with the state of the standard controller 100, the state of the safety controller 200, the state of each safety driver 300, and the state of the servo motor 400. The concept of the "parameters" can include constants, functions (linear functions, and quadratic functions, for example), and the like.

In the specification, "process data" is a general term of data used for at least either the standard control or the safety control. Specifically, the "process data" includes input information acquired from the control target, output information output to the control target, internal information used for a control arithmetic operation of each device, and the like.

The input information includes an ON/OFF signal (digital input) detected by a photoelectric sensor or the like, a physical signal (analog input) detected by a temperature sensor or the like, a pulse signal (pulse input) generated by a pulse encoder or the like, and the like. The output information includes ON/OFF (digital output) for driving a relay and the like, a speed command (analog output) for indicating a rotation speed or the like of the servo motor, a displacement command (pulse output) for indicating the amount of movement or the like of a stepping motor, and the like. The internal information includes state information determined by a control arithmetic operation or the like using arbitrary process data as an input and the like.

Basically, the value of the "process data" is updated in every control cycle or in every communication cycle. Here, updating means that the latest value is reflected and can also include a case in which the value does not change before and after the updating.

Figure 2:
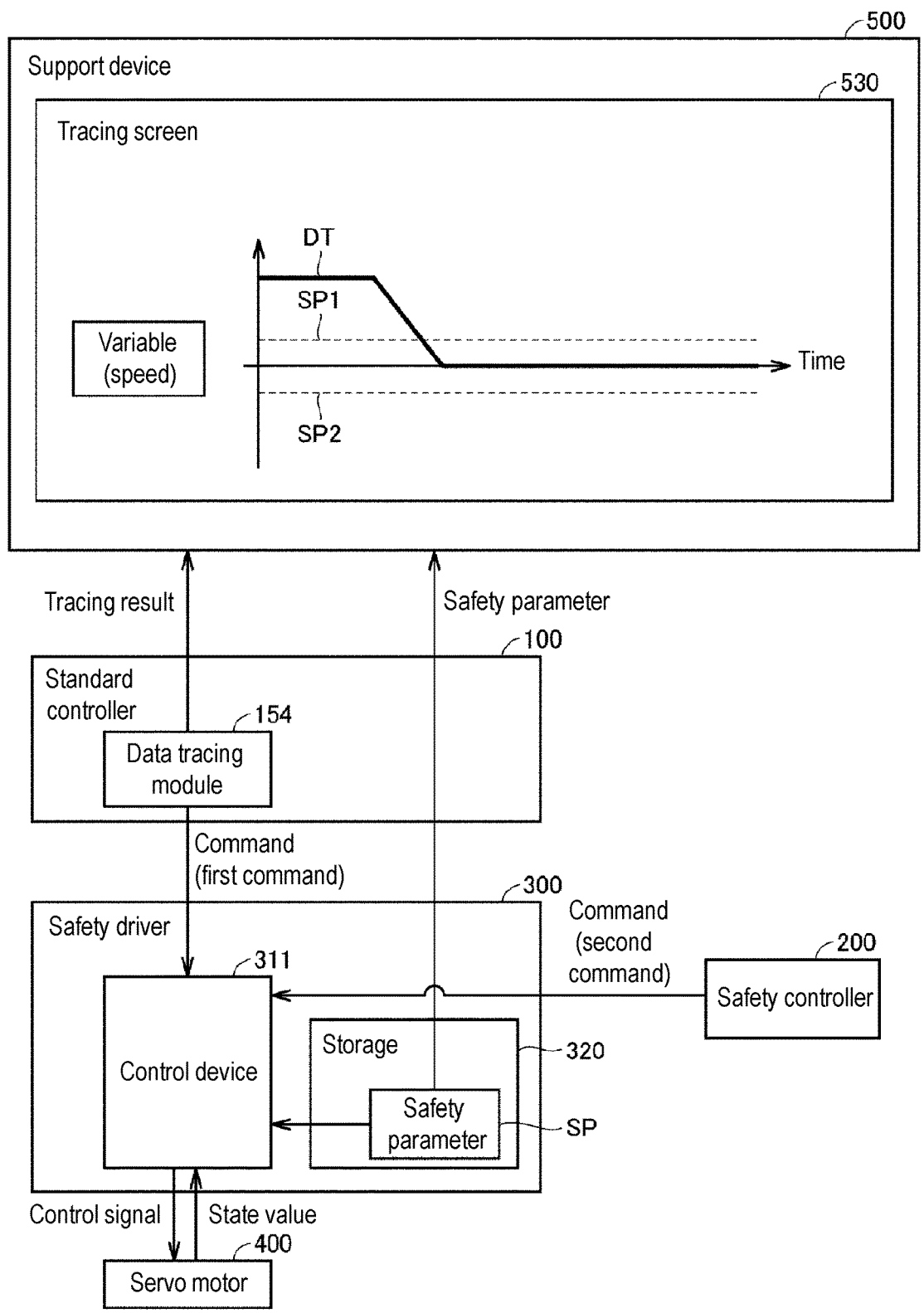
FIG. 2 is a schematic view illustrating functions that the control system has, according to the embodiment.

FIG. 2 is a schematic view illustrating functions that the control system 1 has, according to the embodiment. Referring to FIG. 2, the standard controller 100 includes a data tracing module 154 as a functional module. The safety driver 300 includes a control device 311 and a storage 320 as hardware configurations.

A command (first command) for realizing the standard control is provided from the standard controller 100 to the control device 311 of the safety driver 300. The control device 311 controls each safety driver 300 in accordance with the command from the standard controller 100.

Also, a command (second command) related to the safety functions is provided from the safety controller 200 to the control device 311 of the safety driver 300. In a case in which the control device 311 receives the second command, the control device 311 stops driving of the servo motor 400 on the basis of a state value of the servo motor 400 and safety parameters SP. The safety parameters SP is one or a plurality of predefined setting values corresponding to each of the motion safety functions provided by the safety driver 300. For example, the safety parameters SP can include a speed range, an acceleration range, a stopping time, and the like. The control device 311 compares the safety parameters SP with the state value of the servo motor 400, and in a case in which the comparison result indicates abnormality, the control device 311 stops the servo motor 400.

The data tracing module 154 monitors various state values related to operations of the servo motor 400 that change in accordance with the command (first command) from the standard controller 100. The state values include, for example, a rotation speed of the servo motor 400, the rotation acceleration of the servo motor 400, the current position of the driving target of the servo motor 400, the speed of the driving target of the servo motor 400, the acceleration of the driving target of the servo motor 400, and the like.

The support device 500 acquires a tracing result DT obtained by the data tracing module 154 and the safety parameters SP and displays the safety parameters SP with the safety parameters SP superimposed on the tracing result DT. FIG. 2 illustrates a safety parameter SP1 indicating an upper limit value of a speed of the servo motor 400 and a safety parameter SP2 indicating a lower limit value of the speed of the servo motor 400 as examples of the safety parameters SP. Also, FIG. 2 illustrates transition of the speed of the servo motor 400 as an example of the tracing result DT. The user can easily determine whether or not operations of the servo motor 400 satisfy the specification of the safety functions by checking the tracing result DT and the safety parameters SP in the same graph.

Note that although the data tracing module 154 is mounted in the standard controller 100 in the example in FIG. 2, the data tracing module 154 is not necessarily mounted in the standard controller 100. The data tracing module 154 may be mounted in another unit (a tracing unit, for example) connected to the standard controller 100 as will be described later. Alternatively, the data tracing module 154 may be mounted in a safety controller 200 or a server that is an external device.

B. Configuration Example of Devices Included in Control System 1

Next, a configuration example of devices included in the control system 1 will be described.

(b1: Standard Controller 100)

Figure 3:
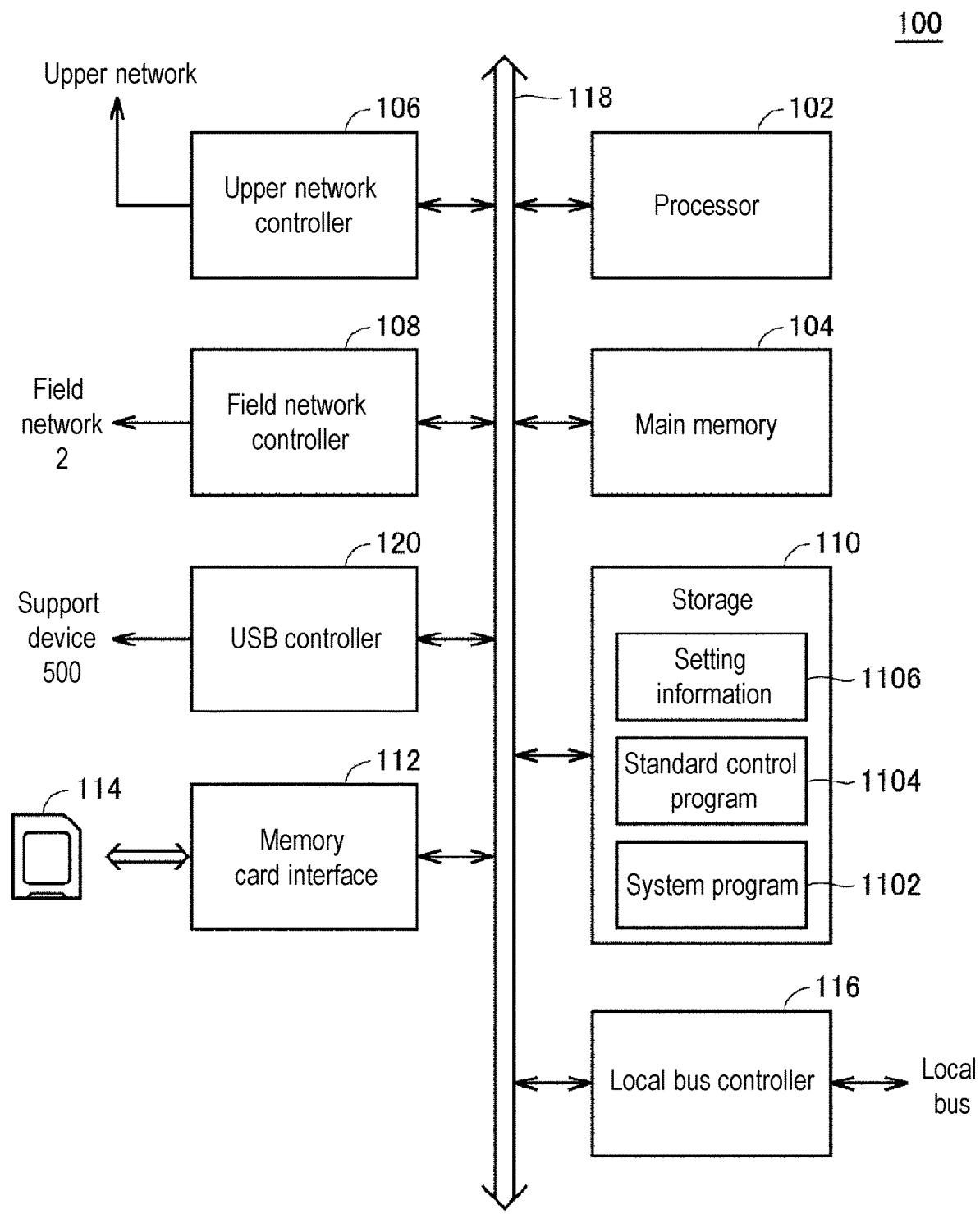
FIG. 3 is a schematic view illustrating a hardware configuration example of a standard controller configuring the control system according to the embodiment.

FIG. 3 is a schematic view illustrating a hardware configuration example of the standard controller 100 configuring the control system 1 according to the embodiment. Referring to FIG. 3, the standard controller 100 includes a processor 102, a main memory 104, a storage 110, an upper network controller 106, a field network controller 108, a universal serial bus (USB) controller 120, a memory card interface 112, and a local bus controller 116. These components are connected to each other via a processor bus 118.

The processor 102 corresponds to an arithmetic operation processing unit that executes a control arithmetic operation related mainly to standard control and is configured of a central processing unit (CPU), a graphics processing unit (GPU), and the like. Specifically, the processor 102 realizes the control arithmetic operation in accordance with a control target and various kinds of processing as will be described later by reading programs (a system program 1102 and a standard control program 1104 in one example) stored in the storage 110 and developing and executing the programs in the main memory 104.

The main memory 104 is configured of a volatile storage device such as a dynamic random access memory (DRAM) or a static random access memory (SRAM). The storage 110 is configured, for example, of a non-volatile storage device such as a solid state drive (SSD) or a hard disk drive (HDD).

The storage 110 stores the standard control program 1104 created in accordance with the control target in addition to the system program 1102 for realizing basic functions. Further, the storage 110 stores setting information 1106 for setting variables and the like as will be described later.

The upper network controller 106 exchanges data with an arbitrary information processing device via an upper network.

The field network controller 108 exchanges data with arbitrary devices including the safety controller 200 and the safety driver 300 via the field network 2. In the control system 1 illustrated in FIG. 3, the field network controller 108 of the standard controller 100 functions as a communication master of the field network 2. The USB controller 120 exchanges data with the support device 500 and the like via USB connection.

The memory card interface 112 receives a memory card 114 that is an example of a detachable recording medium. The memory card interface 112 can write data in the memory card 114 and read various kinds of data (a log, trace data, and the like) from the memory card 114.

The local bus controller 116 exchanges data with an arbitrary unit connected to the standard controller 100 via a local bus.

Although the configuration example in which necessary functions are provided by the processor 102 executing the programs is illustrated in FIG. 3, some or all of these provided functions may be implemented using a dedicated hardware circuit (an application specific integrated circuit (ASIC) or a field-programmable gate array (FPGA), for example). Alternatively, main parts of the standard controller 100 may be realized using hardware (an industrial PC based on a general-purpose PC, for example) in accordance with a general-purpose architecture. In this case, virtualization techniques may be used to execute a plurality of operating systems (OSs) for different applications in parallel and execute a necessary application on each OS. Further, a configuration in which functions such as a display device and a support device are integrated in the standard controller 100 may be employed.

(b2: Safety Controller 200)

Figure 4:
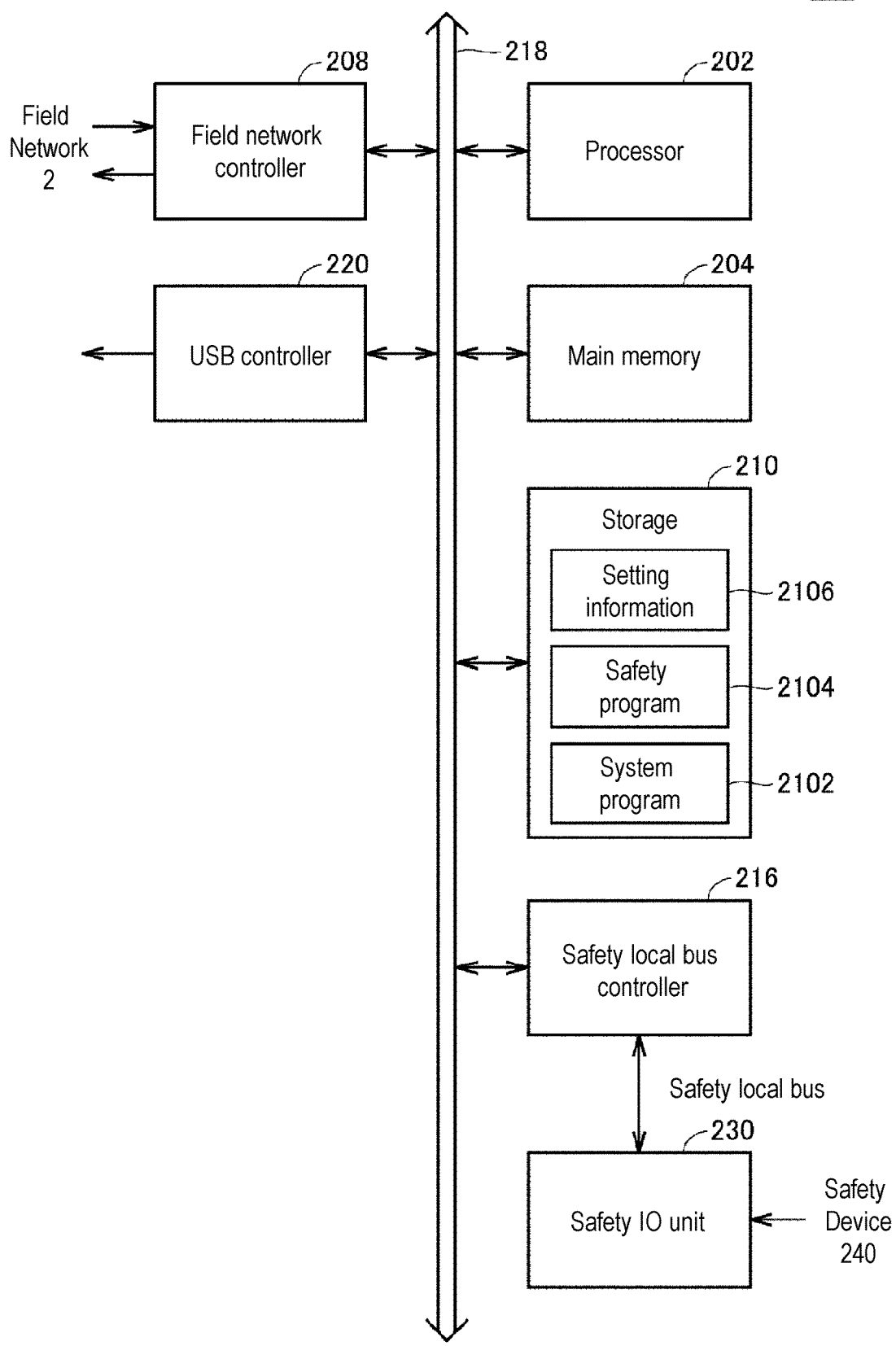
FIG. 4 is a schematic diagram illustrating a hardware configuration example of a safety controller configuring the control system according to the embodiment.

FIG. 4 is a schematic view illustrating a hardware configuration example of the safety controller 200 configuring the control system 1 according to the embodiment. Referring to FIG. 4, the safety controller 200 includes a processor 202, a main memory 204, a storage 210, a field network controller 208, a USB controller 220, and a safety local bus controller 216. These components are connected via a processor bus 218.

The processor 202 corresponds to an arithmetic operation processing unit that mainly executes a control arithmetic operation related to safety control and is configured of a CPU, a GPU, and the like. Specifically, the processor 202 realizes a control arithmetic operation for providing necessary safety functions and various kinds of processing as will be described later by reading programs (a system program 2102 and a safety program 2104 in one example) stored in the storage 210 and developing and executing the programs in the main memory 204.

The main memory 204 is configured of a volatile storage device such as a DRAM or an SRAM. The storage 210 is configured, for example, of a non-volatile storage device such as an SSD or an HDD.

The storage 210 stores the safety program 2104 created in accordance with required safety functions in addition to the system program 2102 for realizing basic functions. Further, the storage 210 stores setting information 2106 for setting variables and the like as will be described later.

The field network controller 208 exchanges data with arbitrary devices including the standard controller 100 and the safety driver 300 via the field network 2. In the control system 1 illustrated in FIG. 3, the field network controller 208 of the safety controller 200 functions as a communication slave of the field network 2. The USB controller 220 exchanges data with an information processing device such as the support device 500 via USB connection.

The safety local bus controller 216 exchanges data with an arbitrary safety unit connected to the safety controller 200 via a safety local bus. FIG. 4 illustrates a safety IO unit 230 as an example of the safety unit.

The safety IO unit 230 exchanges input and output signals with the arbitrary safety device 240. More specifically, the safety IO unit 230 receives input signals from the safety device 240 such as a safety sensor and a safety switch. Alternatively, the safety IO unit 230 outputs commands to the safety device 240 such as a safety relay.

Although FIG. 4 illustrates a configuration example in which necessary functions are provided by the processor 202 executing the programs, some or all of these provided functions may be implemented using a dedicated hardware circuit (an ASIC or an FPGA, for example). Alternatively, main parts of the safety controller 200 may be realized using hardware (an industrial PC based on a general-purpose PC, for example) in accordance with a general-purpose architecture.

(b3: Safety Driver 300 and Servo Motor 400)

Figure 5:
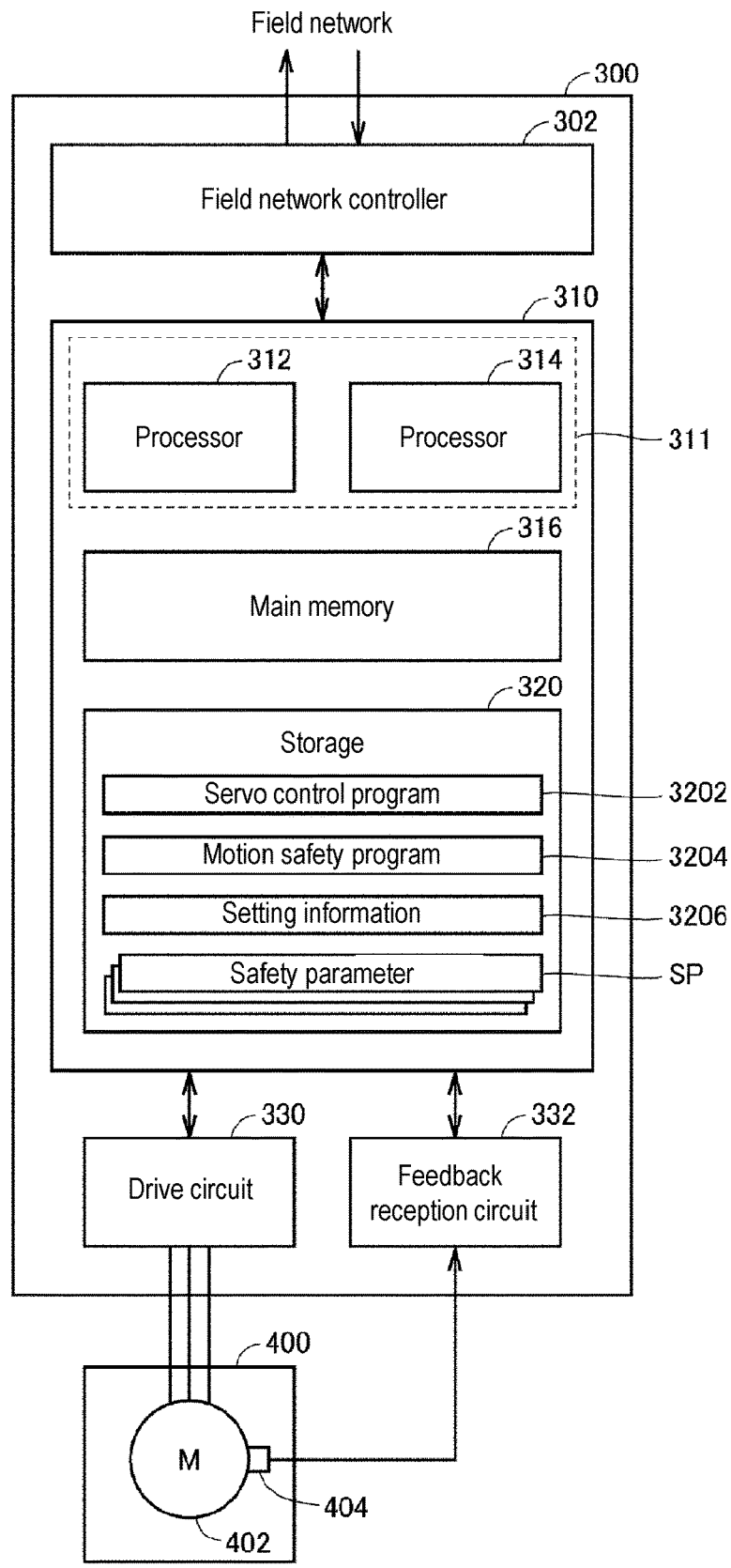
FIG. 5 is a schematic view illustrating a hardware configuration example of a safety driver and a servo motor configuring the control system according to the embodiment.

FIG. 5 is a schematic view illustrating a hardware configuration example of the safety driver 300 and the servo motor 400 configuring the control system 1 according to the embodiment. Referring to FIG. 5, the safety driver 300 includes a field network controller 302, a control unit 310, a drive circuit 330, and a feedback reception circuit 332. The field network controller 302 exchanges data with arbitrary devices including the standard controller 100 and the safety controller 200 via the field network 2. In the control system 1 illustrated in FIG. 5, the field network controller 302 of the safety driver 300 functions as a communication slave of the field network 2.

The control unit 310 executes necessary arithmetic operation processing for causing the safety driver 300 to operate. In one example, the control unit 310 includes a control device 311 that controls the safety driver 300, a main memory 316, and a storage 320. The control device 311 is configured of one or more processors. For example, the control device 311 is configured of two processors 312 and 314.

The processor 312 corresponds to an arithmetic operation processing unit that mainly executes a control arithmetic operation for driving the servo motor 400. The processor 314 corresponds to an arithmetic operation processing unit that mainly executes a control arithmetic operation for providing safety functions related to the servo motor 400. Both the processors 312 and 314 are configured of CPUs or the like.

The main memory 316 is configured of a volatile storage device such as a DRAM or an SRAM. The storage 320 is configured, for example, of a non-volatile storage device such as an SSD or an HDD.

The storage 320 stores a servo control program 3202 for realizing a servo control 350, a motion safety program 3204 for realizing a motion safety function 360, setting information 3206 for setting variables and the like released to other devices, and a plurality of safety parameters SP related to types of safety functions.

Although FIG. 5 illustrates, as an example, a configuration in which the two processors 312 and 314 execute control arithmetic operations for mutually different purposes to enhance reliability, the configuration is not limited thereto, and any configuration may be employed as long as it is possible to realize required safety functions. In a case in which a plurality of cores are included in a single processor, for example, control arithmetic operations corresponding to each of the processors 312 and 314 may be executed. Also, although FIG. 5 illustrates a configuration example in which necessary functions are provided by the processors 312 and 314 executing the programs, some or all of the provided functions may be implemented using a dedicated hardware circuit (an ASIC or an FPGA, for example).

The drive circuit 330 includes a converter circuit, an inverter circuit, and the like, generates electric power of a voltage, a current, and a phase as designated in accordance with a command from the control unit 310, and supplies the electric power to the servo motor 400.

The feedback reception circuit 332 receives a feedback signal from the servo motor 400 and outputs the reception result to the control unit 310.

The servo motor 400 typically includes a three-phase AC motor 402 and an encoder 404 attached to a rotation shaft of the three-phase AC motor 402.

The three-phase AC motor 402 is an actuator that receives the electric power supplied from the safety driver 300 and generates a rotation force. Although FIG. 5 illustrates the three-phase AC motor as an example, the motor is not limited thereto, and the motor may be a DC motor, a single-phase AC motor, or a multi-phase AC motor. Further, an actuator that generates a drive force along a straight line such as a linear servo may also be employed.

The encoder 404 outputs feedback signals (typically, pulse signals of the number corresponding to a rotation frequency) in accordance with a rotation frequency of the three-phase AC motor 402.

(b4: Support Device 500)

Figure 6:
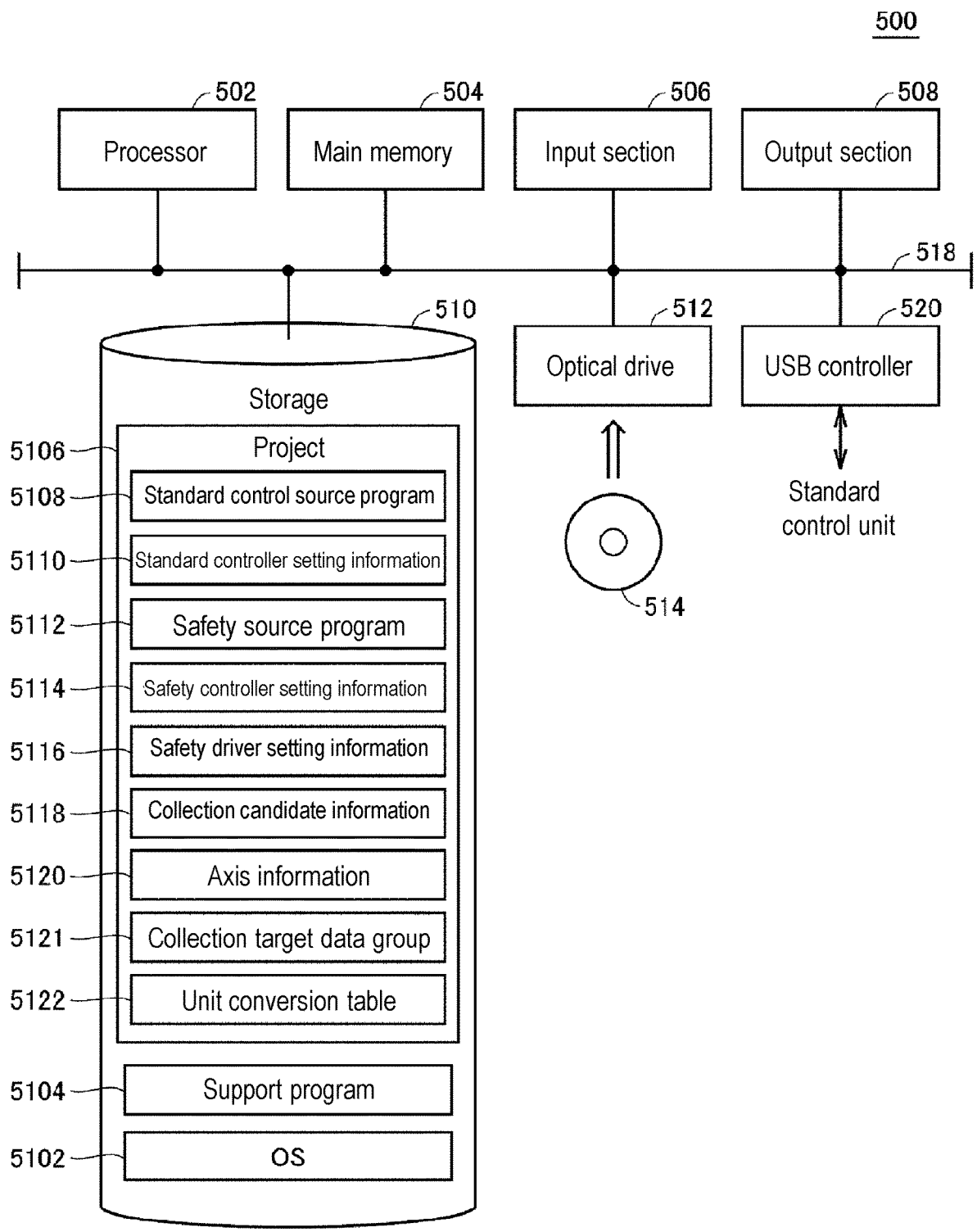
FIG. 6 is a schematic view illustrating a hardware configuration example of a support device configuring the control system according to the embodiment.

FIG. 6 is a schematic view illustrating a hardware configuration example of the support device 500 configuring the control system 1 according to the embodiment. The support device 500 is realized using hardware (a general-purpose PC) in accordance with a general-purpose architecture in one example.

Referring to FIG. 6, the support device 500 includes a processor 502, a main memory 504, an input section 506, an output section 508, a storage 510, an optical drive 512, and a USB controller 520. These components are connected via a processor bus 518.

The processor 502 is configured of a CPU, a GPU, or the like and realizes various kinds of processing as will be described later by reading programs (an OS 5102 and a support program 5104 in one example) stored in the storage 510 and developing and executing the programs in the main memory 504.

The main memory 504 is configured of a volatile storage device such as a DRAM or an SRAM. The storage 510 is configured, for example, of a non-volatile storage device such as an HDD or an SDD.

The storage 510 stores the support program 5104 for providing functions of the support device 500 in addition to the OS 5102 for realizing basic functions. In other words, the support program 5104 realizes the support device 500 according to the embodiment by being executed by a computer connected to the control system 1.

Further, the storage 510 stores project data 5106 created by the user in a development environment provided through execution of the support program 5104.

In the embodiment, the support device 500 provides a development environment in which setting for each device included in the control system 1 and creation of programs executed by each device can be performed in an integrated manner. The project data 5106 includes data created in such an integrated development environment. Typically, the project data 5106 includes a standard control source program 5108, standard controller setting information 5110, a safety source program 5112, safety controller setting information 5114, safety driver setting information 5116, collection candidate information 5118, axis information 5120, a collection target data group 5121, and a unit conversion table 5122.

The standard control source program 5108 is converted into an object code, is then transmitted to the standard controller 100, and is stored as the standard control program 1104 (see FIG. 3). Similarly, the standard controller setting information 5110, the axis information 5120, the collection target data group 5121, and the unit conversion table 5122 are also transmitted to the standard controller 100 and are stored as the setting information 1106 (see FIG. 3).

The safety source program 5112 is converted into an object code, is then transmitted to the safety controller 200, and is stored as the safety program 2104 (see FIG. 4). Similarly, the safety controller setting information 5114 is also transmitted to the safety controller 200 and is stored as the setting information 2106 (see FIG. 4).

The safety driver setting information 5116 is transmitted to the safety driver 300 and is stored as the setting information 3206 (see FIG. 5).

The input section 506 is configured of a keyboard, a mouse, and the like and receives user's operations. The output section 508 is configured of a display, various indicators, a printer, and the like and outputs processing results and the like from the processor 502. The display may be configured integrally with the support device 500 or may be externally connected to the support device 500.

The USB controller 520 exchanges data with the standard controller 100 and the like via USB connection.

The support device 500 includes an optical drive 512, and programs stored in a recording medium 514 (an optical recording medium such as a digital versatile disc (DVD), for example) that stores a computer-readable program in a non-transitory manner is read from the recording medium 514 and is then installed in the storage 510 or the like.

Although the support program 5104 and the like executed by the support device 500 may be installed via the computer readable recording medium 514, the support program 5104 and the like may be installed in such a manner that the support program 5104 and the like are downloaded from a server device on the network. Also, the functions provided by the support device 500 according to the embodiment may be realized in such a form in which some of modules provided by the OSs is used.

Although FIG. 6 illustrates the configuration example in which necessary functions of the support device 500 are provided by the processor 502 executing the programs, some or all of the provided functions may be implemented using a dedicated hardware circuit (an ASIC or an FPGA, for example).

Note that the support device 500 may be detached from the standard controller 100 when the control system 1 is operating.

C. Function Assignment in Control System 1

Figure 7:
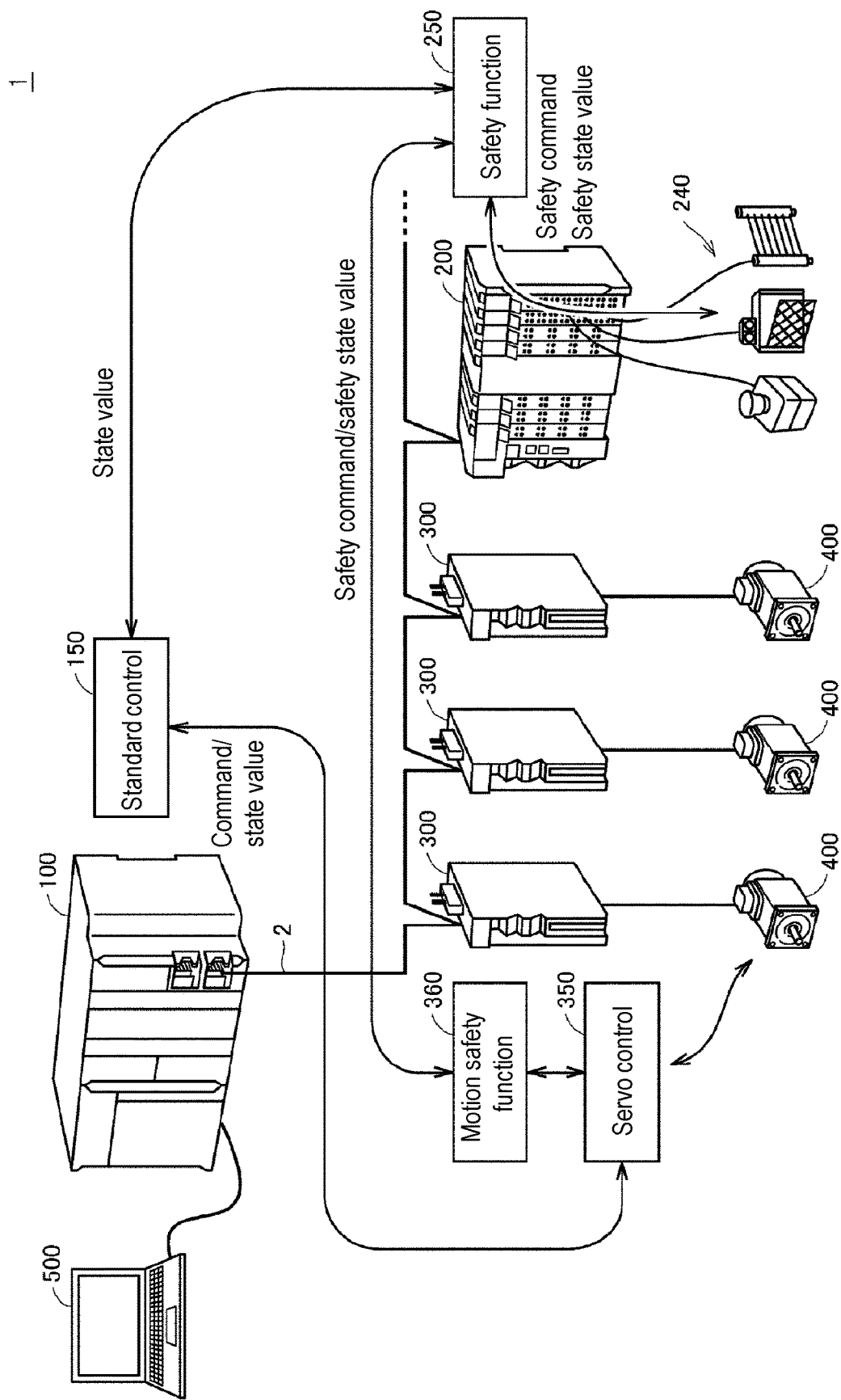
FIG. 7 is a schematic view illustrating an example of function assignment in the control system according to the embodiment.

Next, an example of function assignment in the control system 1 will be described. FIG. 7 is a schematic view illustrating an example of function assignment in the control system 1 according to the embodiment.

Referring to FIG. 7, the safety driver 300 executes the servo control 350 in relation to the standard control 150 executed by the standard controller 100. The standard control 150 includes processing of periodically calculating a command for driving the servo motor 400 in accordance with a user program set in advance for the control target. Also, the servo control 350 includes processing of performing control to drive the servo motor 400 in accordance with the command periodically calculated by the standard control 150 and of acquiring and outputting a state value indicating an operation state of the servo motor 400. The processor 312 (see FIG. 5) of the safety driver 300 corresponds to the servo control 350.

On the other hand, the safety driver 300 provides the motion safety function 360 in a manner corresponding to the safety function 250 provided by the safety controller 200. The processor 314 (see FIG. 5) of the safety driver 300 corresponds to the motion safety function 360.

The safety function 250 activates a safety function designated in advance if predefined conditions are satisfied, on the basis of a state value held by the standard control 150 executed by the standard controller 100, a state value indicated by a signal from the safety device 240, a state value held by the safety driver 300, and the like.

The processing of activating the safety function designated in advance includes, for example, an output of a safety command to the safety driver 300, an output of a safety command (to disconnect a safety relay related to power supply to a specific device, for example) to the safety device 240, or the like.

The safety driver 300 responds to the safety command from the safety controller 200 and provides the designated motion safety function 360. In accordance with the type of the designated motion safety function 360, processing of intervening control of the servo motor 400 provided by the servo control 350 and disconnecting power supply to the servo motor 400, processing of monitoring whether or not the state value for the control of the servo motor 400 provided by the servo control 350 falls within a predefined limited range, or the like is executed.

Figure 8:
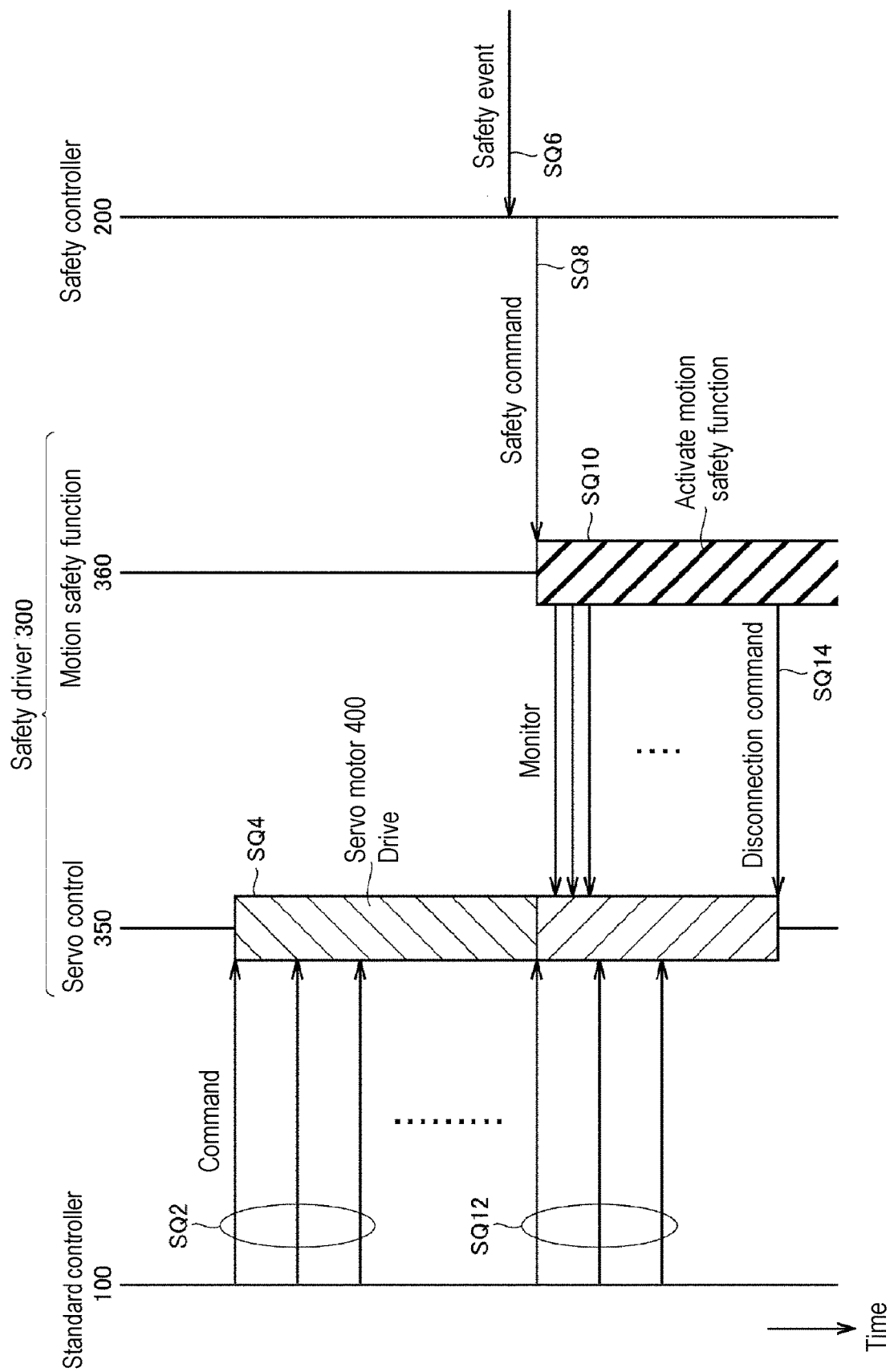
FIG. 8 is a sequence diagram illustrating an example of a processing procedure related to safety functions performed by the safety driver of the control system according to the embodiment.

FIG. 8 is a sequence diagram illustrating a processing procedure related to safety functions performed by the safety driver 300 of the control system 1 according to the embodiment. Referring to FIG. 8, the standard control 150 of the standard controller 100 periodically calculates a command and outputs the command to the safety driver 300 (servo control 350) (Sequence SQ2). The servo control 350 of the safety driver 300 drives the servo motor 400 in accordance with the command from the standard control 150 (Sequence SQ4).

If a safety event from the safety device 240 (a safety sensor, for example) occurs at a certain timing (Sequence SQ6), then the safety controller 200 outputs a safety command to the safety driver 300 (motion safety function 360) (Sequence SQ8). In response to the safety command, the motion safety function 360 of the safety driver 300 activates the designated safety function (Sequence SQ10).

In response to the activation of the safety function, the standard control 150 of the standard controller 100 calculates and outputs a command in accordance with the activated safety function (Sequence SQ12). On the other hand, the safety driver 300 (motion safety function 360) monitors whether or not an operation state of the servo motor 400 falls within a predefined limited range. If it is determined that the operation state of the servo motor 400 does not fall within the predefined limited range, or if a predefined stop time is reached, the safety driver 300 (motion safety function 360) disconnects power supply to the servo motor 400 (Sequence SQ14).

In this manner, the safety driver 300 can drive the servo motor 400 in accordance with the command from the standard controller 100 (standard control 150) and realize the motion safety function of the safety controller 200 (safety function 250) in response to the command for activating the safety function.

D. Motion Safety Function of Control System 1

Next, an example of the motion safety function provided by the control system 1 will be described.

Figure 9:
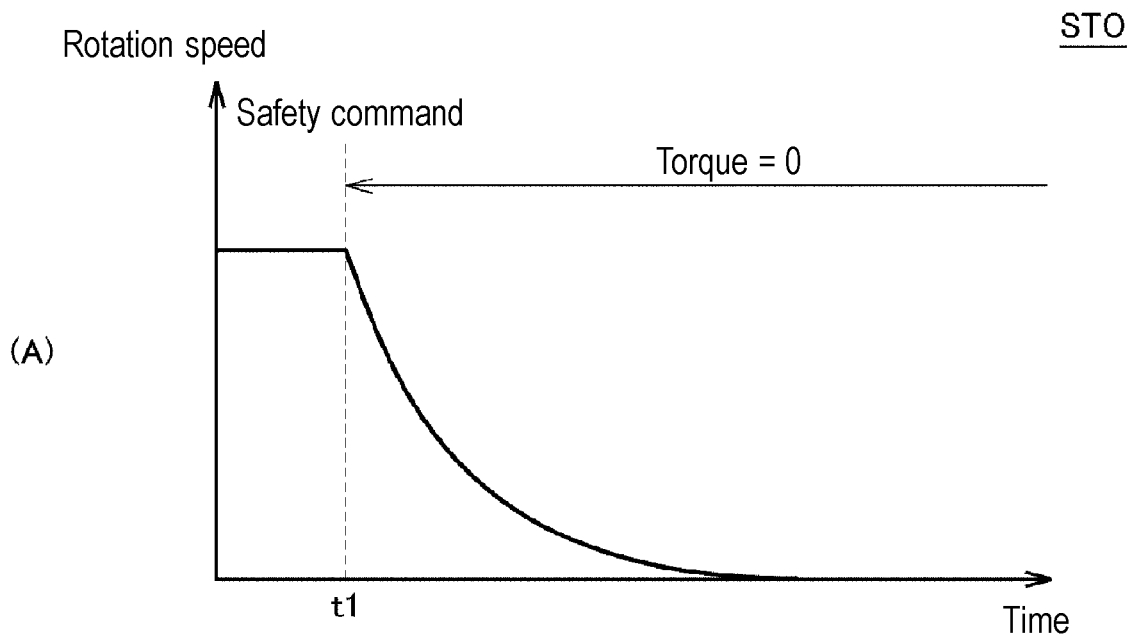
FIG. 9 is a diagram illustrating an example of motion safety functions that the control system provides, according to the embodiment.
Figure 9:
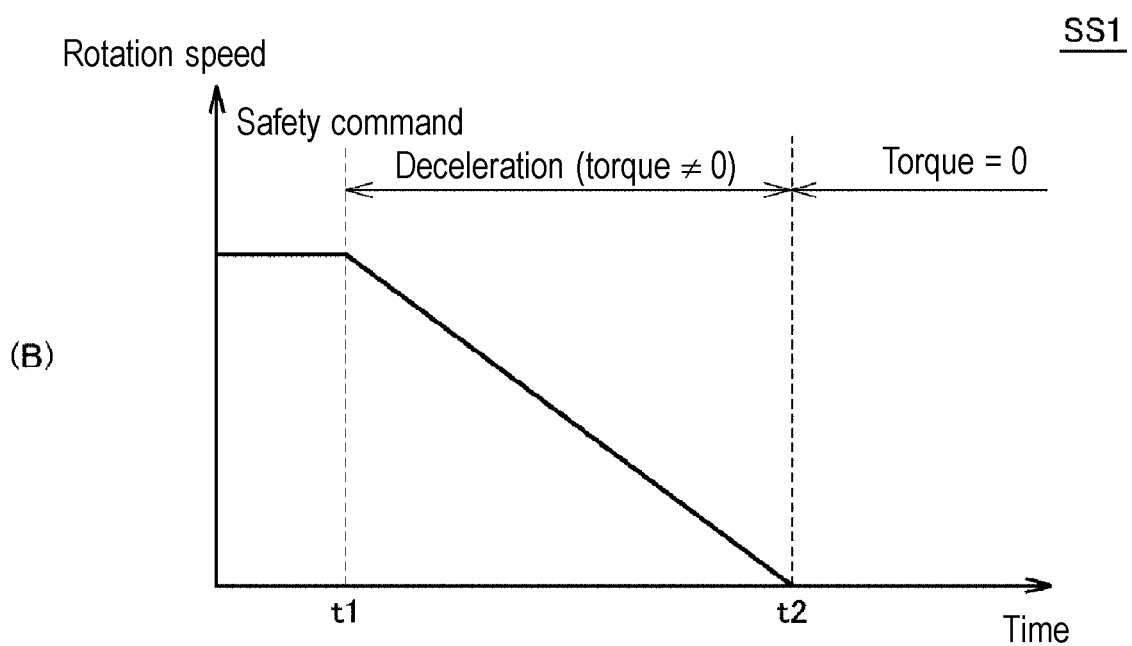

FIG. 9 is a diagram illustrating an example of the motion safety function provided by the control system 1 according to the embodiment. (A) of FIG. 9 illustrates an example of a behavior of the servo motor 400 corresponding to Safe Torque Off (STO) while (B) of FIG. 9 illustrates an example of a behavior of the servo motor 400 corresponding to Safe Stop 1 (SS1).

Referring to (A) of FIG. 9, if a safety command (STO) is provided at a clock time t1 in a state in which the servo motor 400 is operating at a certain rotation speed, then the safety driver 300 disconnects power supply to the servo motor 400 and sets a torque generated in the servo motor 400 to zero. As a result, the servo motor 400 rotates with inertia and then stops. Note that in a case in which the servo motor 400 is provided with a brake, the servo motor 400 can also immediately stop.

Referring to (B) of FIG. 9, if a safety command (SS1) is provided at a clock time t1 in a state in which the servo motor 400 is operating at a certain rotation speed, then the safety driver 300 reduces the rotation speed with a predefined acceleration. At this time, the safety driver 300 may execute power collection (that is, regeneration) from the servo motor 400 or the like. Then, if the rotation speed of the servo motor 400 reaches zero at a clock time t2, the safety driver 300 disconnects power supply to the servo motor 400 and sets the torque generated in the servo motor 400 to zero. A state similar to that in the case of STO as illustrated in (A) of FIG. 9 is achieved at and after the clock time t2.

A safety function with which stopping can be achieved more safely is appropriately selected out of STO illustrated in (A) of FIG. 9 and SS1 illustrated in (B) of FIG. 9 in accordance with properties and the like of facilities mechanically connected to the servo motor 400.

Non-Patent Literature 1 described above defines not only the motion safety functions illustrated in (A) of FIG. 9 and (B) of FIG. 9 but also a plurality of functions. In order to realize each motion safety function, setting for defining a behavior of the servo motor 400 is needed.

FIG. 10 is a diagram illustrating an example of a parameter set 390 for realizing the motion safety functions stored in the safety driver 300 of the control system 1 according to the embodiment. Referring to FIG. 10, the parameter set 390 includes one or a plurality of setting values (safety parameters) corresponding to each of the motion safety functions provided by the safety driver 300.

For example, the setting values corresponding to the motion safety functions can include a speed range, an acceleration range, a stopping time, and the like.

Typically, the user operates the support device 500 to determine a behavior among the motion safety functions in the safety driver 300, and the parameter set 390 corresponding to the determined behavior is transferred to the safety driver 300. The safety driver 300 stores, in advance, the parameter set 390 from the support device 500.

E. Data Communication in Control System 1

Next an example of data communication in the control system 1 will be described.

Figure 11:
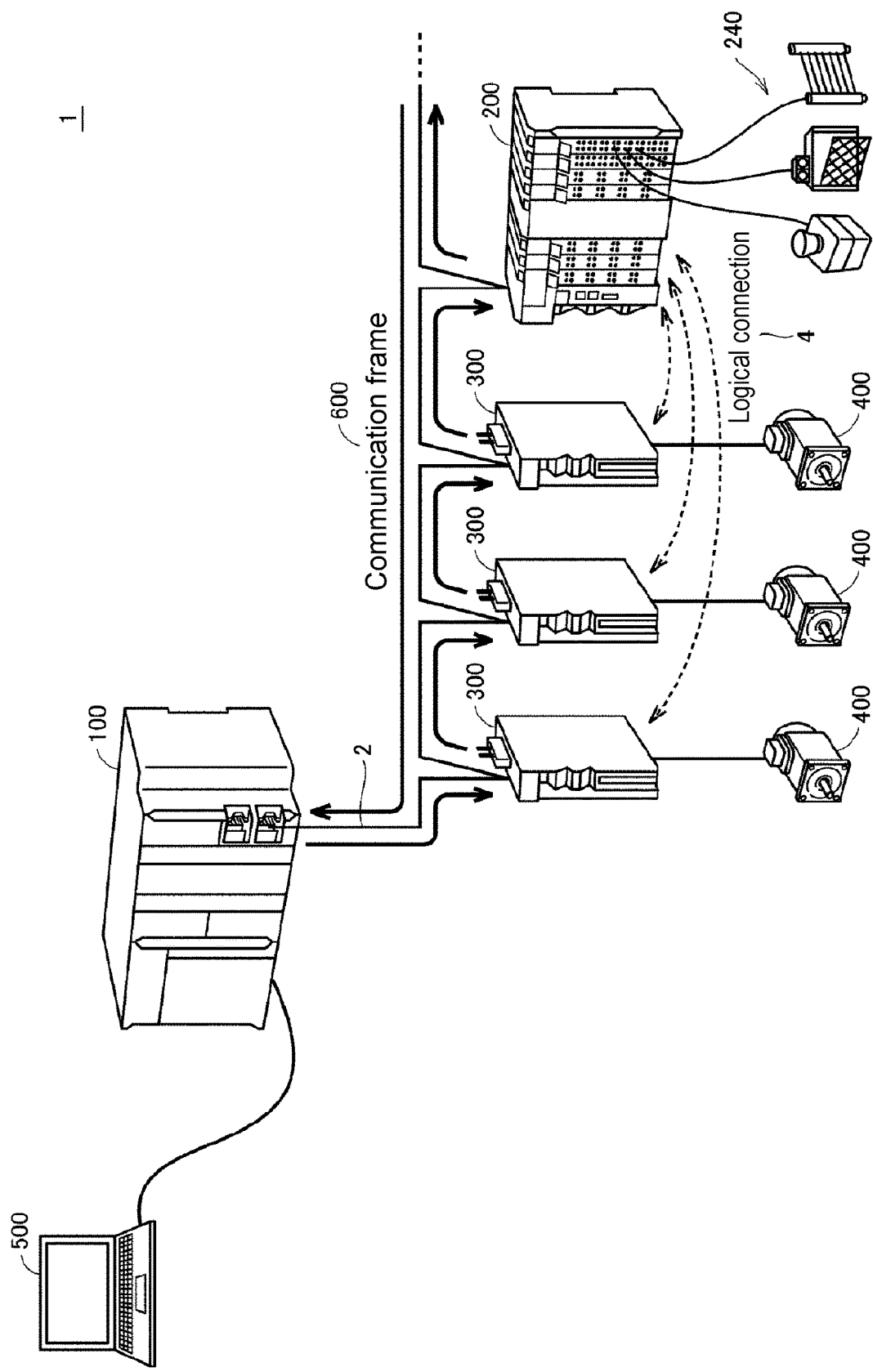
FIG. 11 is a diagram for explaining a transmission form of a communication frame in the control system according to the embodiment.

FIG. 11 is a diagram for explaining a transmission form of a communication frame in the control system 1 according to the embodiment. Referring to FIG. 11, process data communication is performed in the field network 2 of the control system 1, and a communication frame 600 is cyclically (at several to ten and several msec, for example) turned among devices using the standard controller 100 as a communication master. The cycle at which the communication frame 600 is transmitted will also be referred to as a process data communication cycle.

In the embodiment, EtherCAT (registered trademark) is employed as an example of a protocol of the field network 2 via which such a communication frame 600 is cyclically transmitted.

In the communication frame 600, a data region is allocated to each device. If each device receives the communication frame 600 periodically transmitted, then each device writes a current value of data set in advance in the data region allocated to the device itself in the received communication frame 600. Then, the device transmits the communication frame 600 after the current value is written therein to a device in the next stage. The current value of the data written by each device can be referred to by other devices.

The communication frame 600 turned once in the field network 2 and then returned to the communication master (standard controller 100) includes the latest value collected by each device by each device writing the current value of the preset data in the communication frame 600.

In the embodiment, such process data communication is used to form logical connection 4 between the safety controller 200 and each safety driver 300 (see FIG. 11). The logical connection 4 is used to exchange data to realize the safety functions.

In the case in which EtherCAT is employed as the protocol of the field network 2 as described above, it is possible to form the logical connection 4 using a protocol called FailSafe over EtherCAT (FSoE).

More specifically, a dedicated data region for storing a command exchanged to form the logical connection 4 is allocated in the communication frame 600. The logical connection 4 is formed by exchanging commands among the devices using the dedicated data region.

Figure 12:
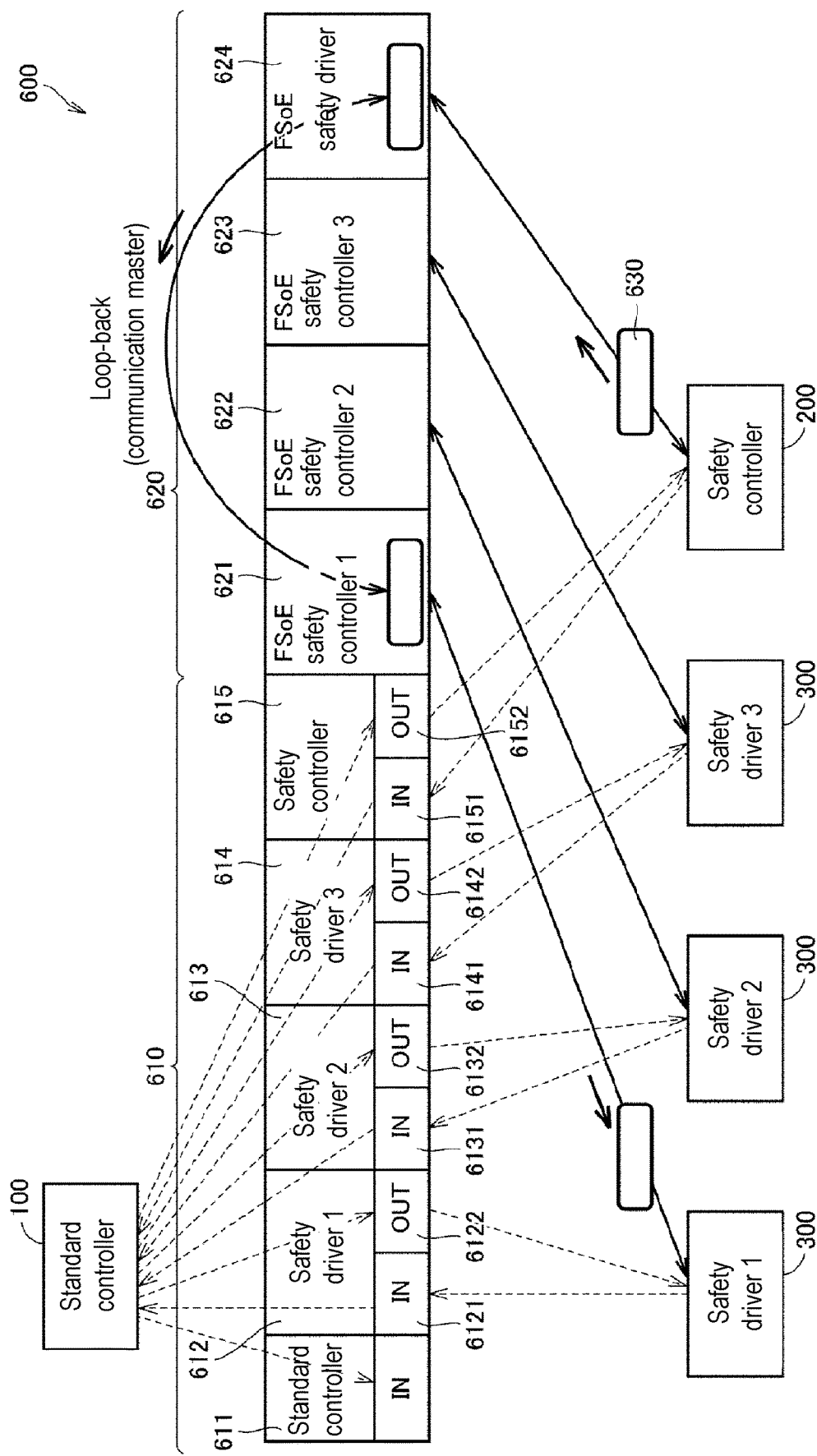
FIG. 12 is a diagram for explaining data transmission in the control system according to the embodiment.

FIG. 12 is a diagram for explaining data transmission in the control system 1 according to the embodiment. Referring to FIG. 12, a data region 620 used for the logical connection 4 is defined in addition to a data region 610 used for process data communication in the communication frame 600.

The data region 610 includes a data region 611 allocated to the standard controller 100, data regions 612, 613, and 614 allocated to the safety drivers 300, and a data region 615 allocated to the safety controller 200.

The data regions 612, 613, 614, and 615 include IN data regions 6121, 6131, 6141, and 6151 for releasing data from each device to other devices and OUT data regions 6122, 6132, 6142, and 6152 for receiving commands at each device.

The IN data regions 6121, 6131, 6141, and 6151 are data regions in which data to be released to other devices out of process data managed by each device is written. Other devices can refer to written data by each device writing necessary data in the IN data region allocated to the device itself in the communication frame 600. Typically, the standard controller 100 calculates a command for each device by executing a control arithmetic operation related to the standard control with reference to the data written by each device at each communication cycle.

A command to be provided to each device is written in the OUT data regions 6122, 6132, 6142, and 6152. Each device generates a signal to be output to the control target or updates an internal control state with reference to the data stored in the OUT data region allocated to the device itself in the communication frame 600. Basically, the standard controller 100 writes data in the OUT data region for each device.

Operations of writing data in and reading data from the data region 610 used in the process data communication, which are performed by each device, are set in advance in accordance with the data region allocated to each device. Such operations for setting writing and reading of data are performed by the user using the support device 500. Then, the setting information is transmitted from the support device 500 to each device.

On the other hand, the data region 620 used for the logical connection 4 includes data regions 621, 622, and 623 allocated to the safety drivers 300 and a data region 624 allocated to the safety controller 200. Each device writes communication frames (hereinafter, also referred to as "safety communication frames 630") relate to the logical connection 4 in and reading the communication frames from the data regions 621, 622, 623, and 624. The standard controller 100 that is a communication master switches the stored safety communication frames 630 among the data regions 621, 622, 623, and 624. The safety communication frame 630 can perform a type of peer-to-peer communication through such loopback processing performed by the communication master.

FIG. 12 illustrates processing in a case in which the safety communication frame 630 is transmitted from the safety controller 200 to the first safety driver 300 in one example. The safety communication frame 630 as illustrated in FIG. 12 is transmitted in a case in which the safety controller 200 activates a specific motion safety function for a specific safety driver 300 or the like.

First, the safety controller 200 generates the safety communication frame 630 to be transmitted to the safety driver 300 that is a transmission destination and writes the safety communication frame 630 in the data region 624 in the communication frame 600. Thereafter, if the communication frame 600 with the safety communication frame 630 written therein reaches the standard controller 100 that is the communication master, then the standard controller 100 copies, in the data region 621, the safety communication frame 630 stored in the data region 624. If the communication frame 600 after the safety communication frame 630 is copied in the data region 621 reaches the safety driver 300 that is the transmission destination, then the safety driver 300 that is the transmission destination refers to the data region 621 and receives the safety communication frame 630.

Also, the safety communication frame 630 from the safety driver 300 to the safety controller 200 is transmitted in a communication path that is opposite to that described above.

As described above, the logical connection 4 is formed using the data region 620 in the communication frame 600 in the control system 1 according to the embodiment.

F. Implementation Example of Standard Control and Safety Control

As described above, the process data communication and the safety communication through the logical connection 4 can be performed in the control system 1 according to the embodiment. Next, an implementation example of the standard control and the safety control using each type of communication will be described.

Figure 13:
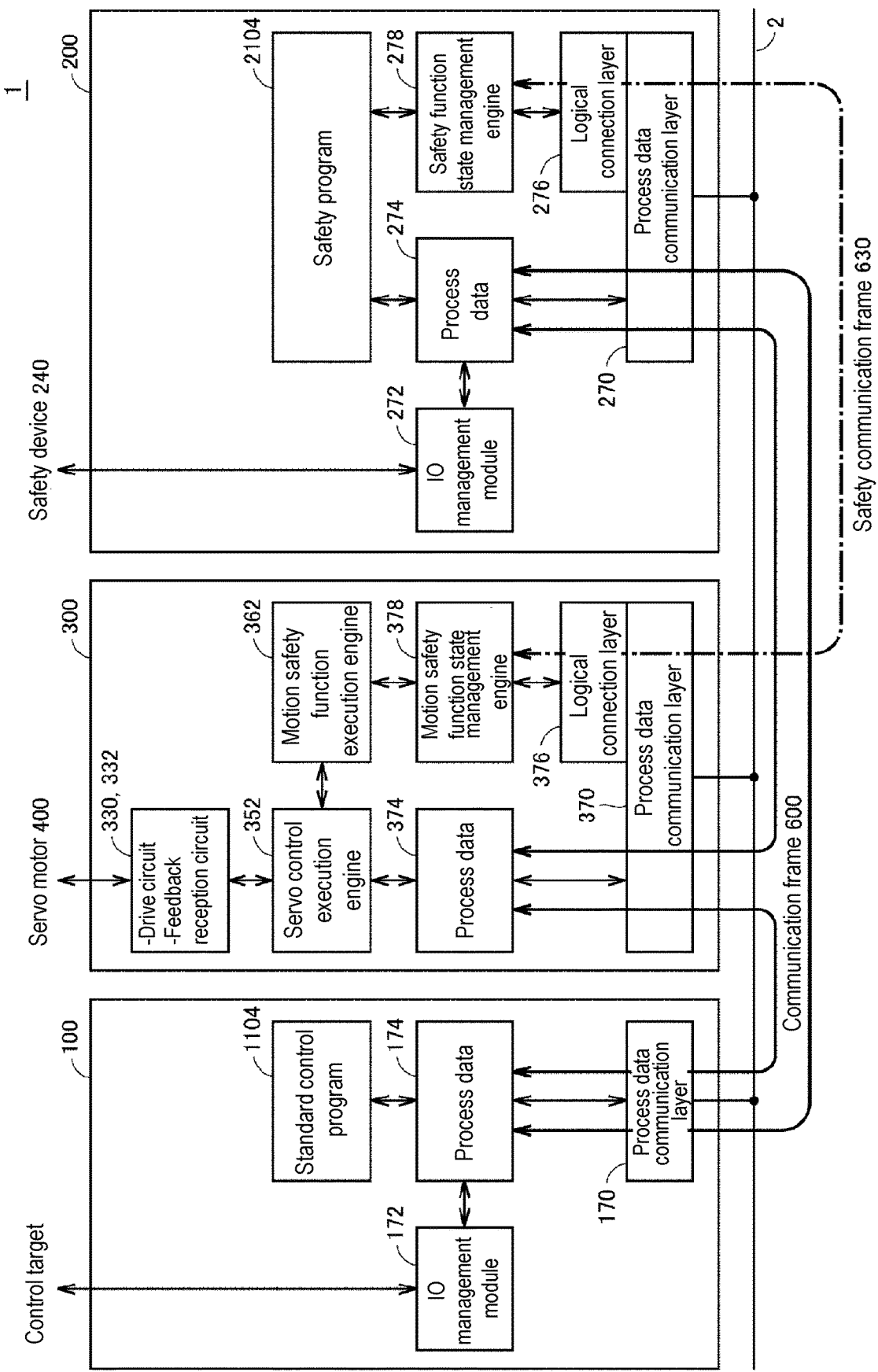
FIG. 13 is a schematic view illustrating an implementation example of standard control and safety control in the control system according to the embodiment.

FIG. 13 is a schematic view illustrating an implementation example of the standard control and the safety control in the control system 1 according to the embodiment. For convenience of explanation, FIG. 13 illustrates an example of the control system 1 including one safety driver 300 in addition to the standard controller 100 and the safety controller 200.

Referring to FIG. 13, the standard controller 100 includes, as main functional configurations, a process data communication layer 170 and an IO management module 172. The safety controller 200 includes, as main functional configurations, a process data communication layer 270, an IO management module 272, a logical connection layer 276, and a safety function state management engine 278. The safety driver 300 includes, as main functional configurations, a process data communication layer 370, a logical connection layer 376, a motion safety function state management engine 378, a servo control execution engine 352, and a motion safety function execution engine 362.

The process data communication layer 170, the process data communication layer 270, and the process data communication layer 370 are in charge of transfer of the communication frame 600 on the field network 2. Each of the process data communication layer 170, the process data communication layer 270, and the process data communication layer 370 updates process data 174, 274, and 374 of each device on the basis of data included in the arriving communication frame 600. Also, each of the process data communication layer 170, the process data communication layer 270, and the process data communication layer 370 writes process data designated in advance in the data region that has been allocated to the device in advance, regenerates the communication frame 600, and sends the communication frame 600 to the device in the next stage. At least a part of the process data is shared through the process data communication.

The logical connection layer 276 of the safety controller 200 and the logical connection layer 376 of the safety driver 300 are in charge of exchanging of the safety communication frames 630. In other words, the logical connection layer 276 and the logical connection layer 376 exchange commands and data using the safety communication frames 630 included in the communication frame 600 in accordance with the protocol (FSoE in the embodiment) for forming the logical connection.

In the standard controller 100, the IO management module 172 updates the process data 174 through exchanging of signals with the control target. The standard control program 1104 executed by the standard controller 100 executes a control arithmetic operation with reference to the process data 174 and updates the process data 174 with the result of executing the control arithmetic operation.

In the safety controller 200, the IO management module 272 updates the process data 274 through exchanging of signals with the safety device 240. Although the process data 274 is collectively expressed in FIG. 13, the process data (for the standard control) updated through the process data communication and the process data (for the safety control) updated through the exchanging of data with the safety device 240 may be managed in different levels.

The safety program 2104 executed by the safety controller 200 executes a control arithmetic operation with reference to the process data 274 and the safety function state management engine 278, and updates the process data 274 on the basis of the result of executing the control arithmetic operation, or outputs an internal command to the safety function state management engine 278.

The safety function state management engine 278 generates a command for activating a specific motion safety function for the specific safety driver 300 in accordance with the result of the control arithmetic operation executed by the safety program 2104. The logical connection layer 276 exchanges necessary commands and information with the logical connection layer 376 of the target safety driver 300 using the safety communication frame 630 in response to the command from the safety function state management engine 278.

In the safety driver 300, the servo control execution engine 352 executes a control arithmetic operation related to the servo control with reference to the process data 374 and information regarding a feedback signal acquired via the feedback reception circuit 332. The servo control execution engine 352 updates the process data 374 and outputs an internal command to the drive circuit 330 on the basis of the result of executing the control arithmetic operation. The drive circuit 330 drives the servo motor 400 in accordance with the command from the servo control execution engine 352.

The motion safety function state management engine 378 corresponds to a state management unit that manages a state of the motion safety functions in accordance with a safety command from the safety controller 200. The motion safety function state management engine 378 outputs an internal command to the motion safety function execution engine 362 in response to a command from the safety controller 200.

The motion safety function execution engine 362 executes the designated motion safety function.

The logical connection layer 376 exchanges necessary commands and information with the logical connection layer 276 of the safety controller 200 using the safety communication frame 630 in response to the command from the motion safety function state management engine 378.

G. Data Tracing Function

Figure 14:
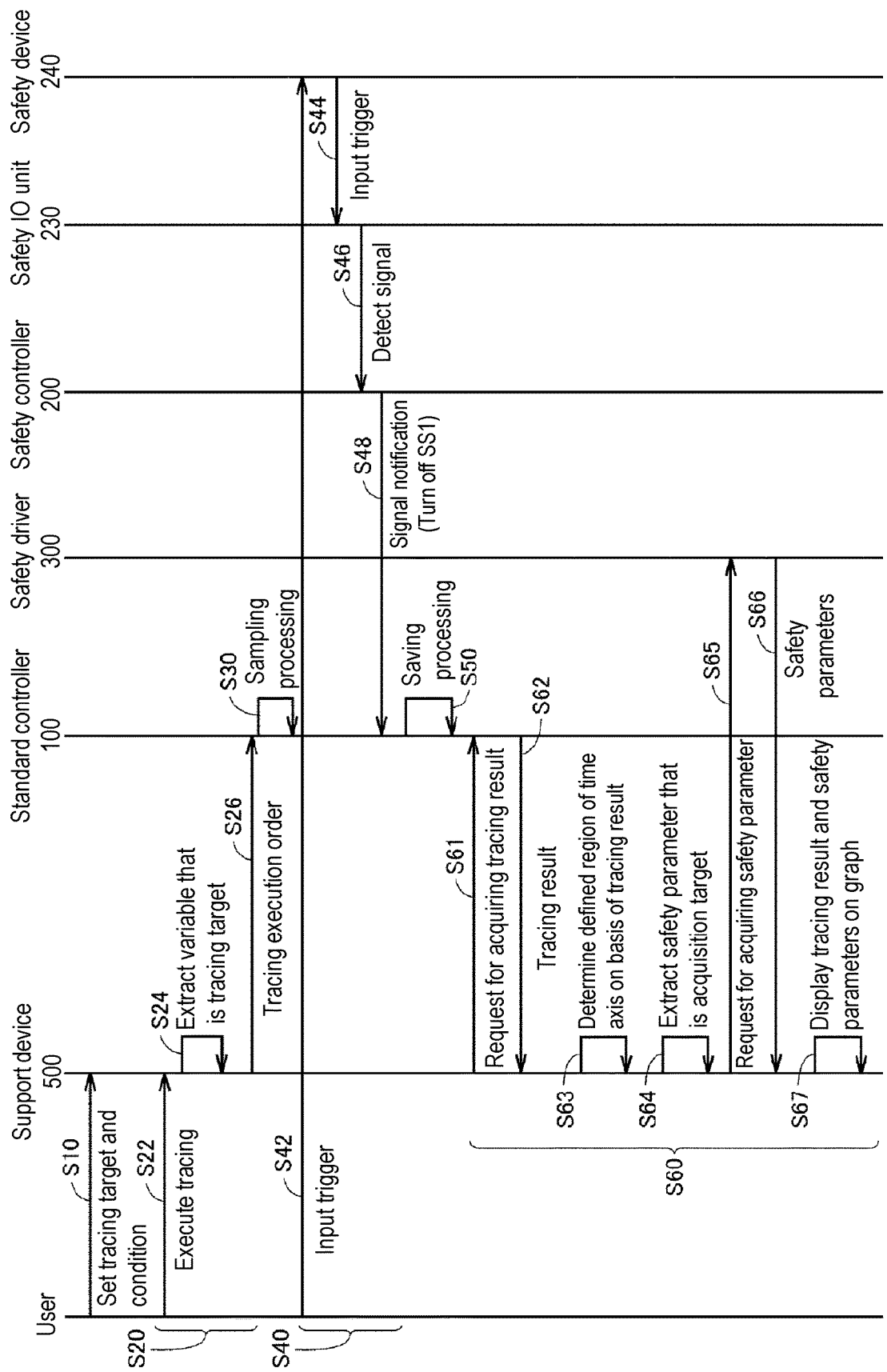
FIG. 14 is a diagram illustrating an example of a control flow for realizing data tracing functions.

Referring to FIG. 14 to FIG. 19, a data tracing function of the control system 1 will be described. FIG. 14 is a diagram illustrating an example of a control flow for realizing the data tracing function. Hereinafter, processing in each step illustrated in FIG. 14 will be described in order.

(G1. Step S10)

First, processing in Step S10 will be described with reference to FIG. 14 to FIG. 17.

In Step S10 illustrated in FIG. 14, the user performs various kinds of setting related to data tracing on the support device 500. In one example, the user sets a group of data including tracing conditions and tracing targets for the support device 500.

Figure 15:
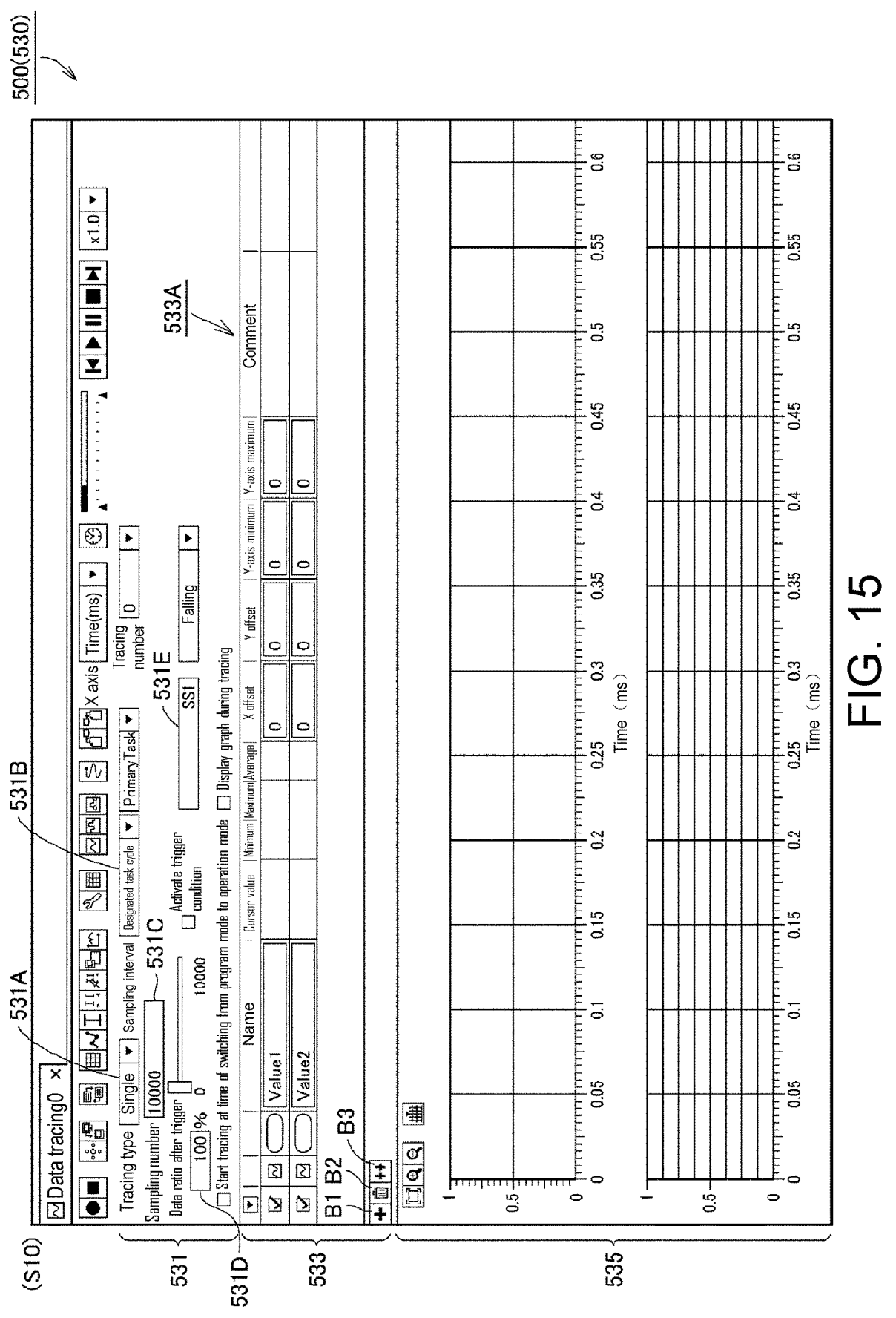

FIG. 15 is a diagram illustrating a data tracing screen 530 that receives various kinds of setting related to data tracing. As illustrated in FIG. 15, the data tracing screen 530 includes a tracing condition setting region 531, a trace target data group setting region 533, and a tracing result display region 535. The tracing condition setting region 531 includes setting regions 531A to 531E.

The setting region 531A receives selection of a tracing type. Selectable tracing types include, for example, single-time tracing and sequential tracing. In a case in which the single-time tracing is selected, data before and after a trigger condition set in the setting region 531E is satisfied is recorded. In a case in which the sequential tracing is selected, data that is a tracing target is continuously recorded regardless of the trigger condition set in the setting region 531E.

The setting region 531B receives setting of a sampling interval during data tracing. The sampling interval is set by designating a task or designating a time, for example. In a case in which a task is designated, an execution cycle of the designated task is set as the sampling cycle. In a case in which a time is designated, the designated time is set as the sampling cycle.

The setting region 531C receives setting of an upper limit value of the number of times sampling is performed per data. More specifically, the standard controller 100 successively writes data that is a tracing target in a predetermined storage region, and in a case in which the number of times sampling is performed reaches the set upper limit value, the standard controller 100 overwrites the oldest data with new data in order.

The setting region 531D receives setting of a data saving ratio before and after the trigger condition set in the setting region 531E is satisfied. More specifically, the standard controller 100 continues to trace data until data of the number of times sampling is performed corresponding to the set saving ratio is collected after the trigger condition is satisfied.

The setting region 531E receives setting of the trigger condition. The setting region 531E receives, for example, designation of a variable name that is a trigger target, a conditional expression (an inequality, an equation, or the like) for the variable, and the like. In a case in which the designated variable satisfies the designated conditional expression, the trigger condition is satisfied. In one example, rising or the like of a variable ("SS1", for example) related to a safety function is set as the trigger condition. If the trigger condition is satisfied, then monitoring of a sampling end condition is started. The sampling end condition depends on the number of times sampling is performed set in the setting region 531C and the saving ratio set in the setting region 531D. In a case of an example in which the number of times sampling is performed is set to 10,000 times and the saving ratio is set to 50%, the standard controller 100 performs the sampling 5,000 times (=10,000 times×0.5) after the trigger condition is satisfied and then stops the data tracing. In this manner, the data of sampling performed 5,000 times before the trigger condition is satisfied and data of sampling performed 5,000 times after the trigger condition is satisfied remain as a tracing result.

The setting region 533 receives setting of a tracing target data group. The setting region 533 includes a data list 533A in which the tracing target data group is displayed, an addition button B1, a deletion button B2, and a bulk addition button B3.

If the user presses the addition button B1, one row of a data setting section is added to the data list 533A. The user can input a variable name or the like of the tracing target data in the added setting section.

If the user presses the deletion button B2 in a state in which any of setting sections in the data list 533A is selected, the user can delete the selected setting section from the data list 533A.

Figure 16:
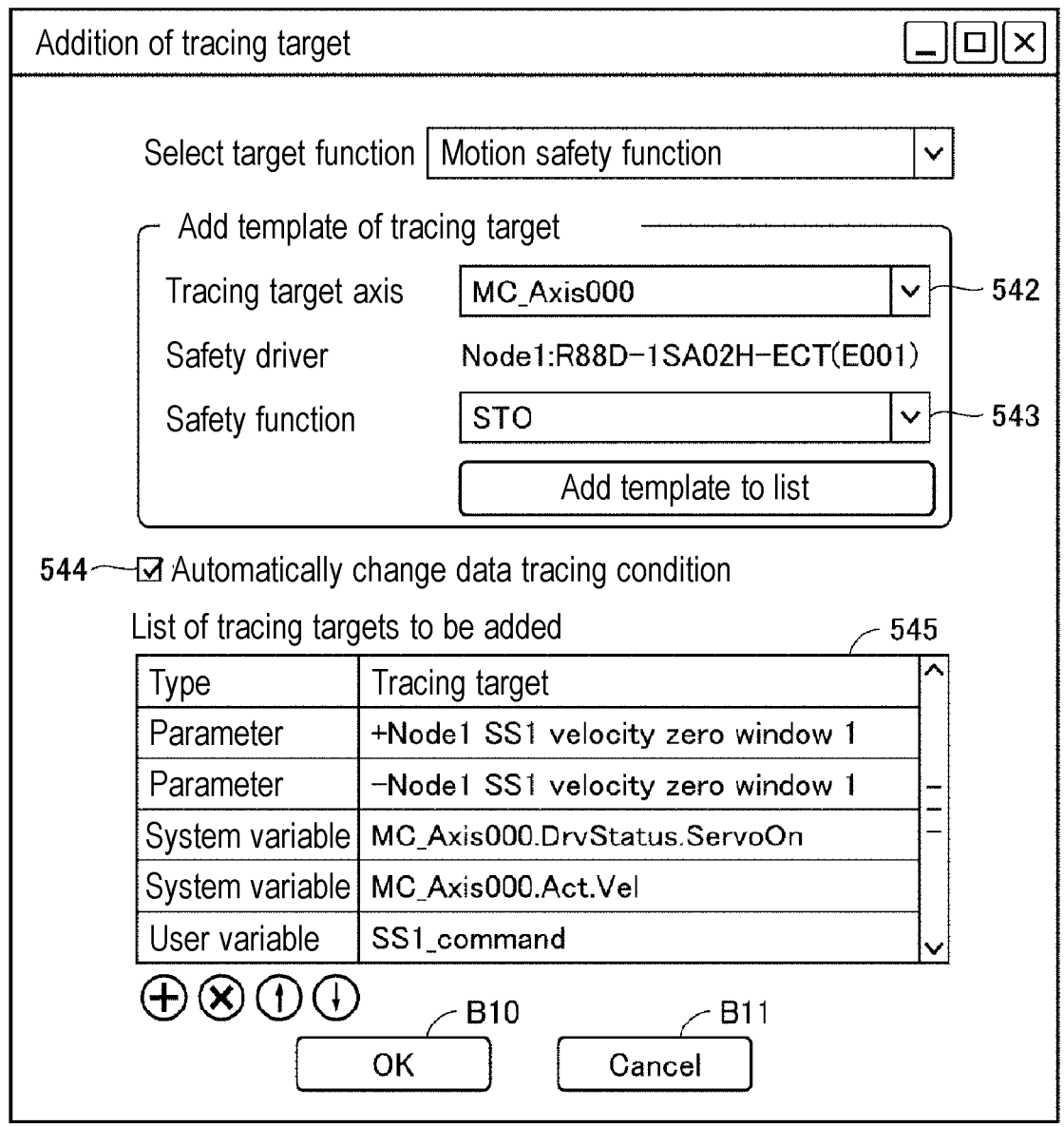
FIG. 16 is a diagram illustrating a bulk setting screen of a tracing target data group.

If the user presses the bulk addition button B3, then support device 500 opens a bulk setting screen of the tracing target data group in a window different from the data tracing screen 530. FIG. 16 is a diagram illustrating a bulk setting screen 540 for a tracing target data group.

The bulk setting screen 540 includes a setting region 542 (motor receiving section) that receives selection of an axis that is a tracing target, a setting region 543 (function receiving section) that receives selection of a safety function, and a display region 545 that displays a tracing target data group. Here, the "axis" means an axis that is a target driven by the servo motor 400. The servo motor 400 and the axis have a one-to-one correspondence, and selecting the axis that is a tracing target has the same meaning as selecting of the servo motor 400 that is a tracing target. The support device 500 determines candidates of tracing target data group on the basis of the axis selected in the setting region 542 and the safety function selected in the setting region 543.

Figure 17:
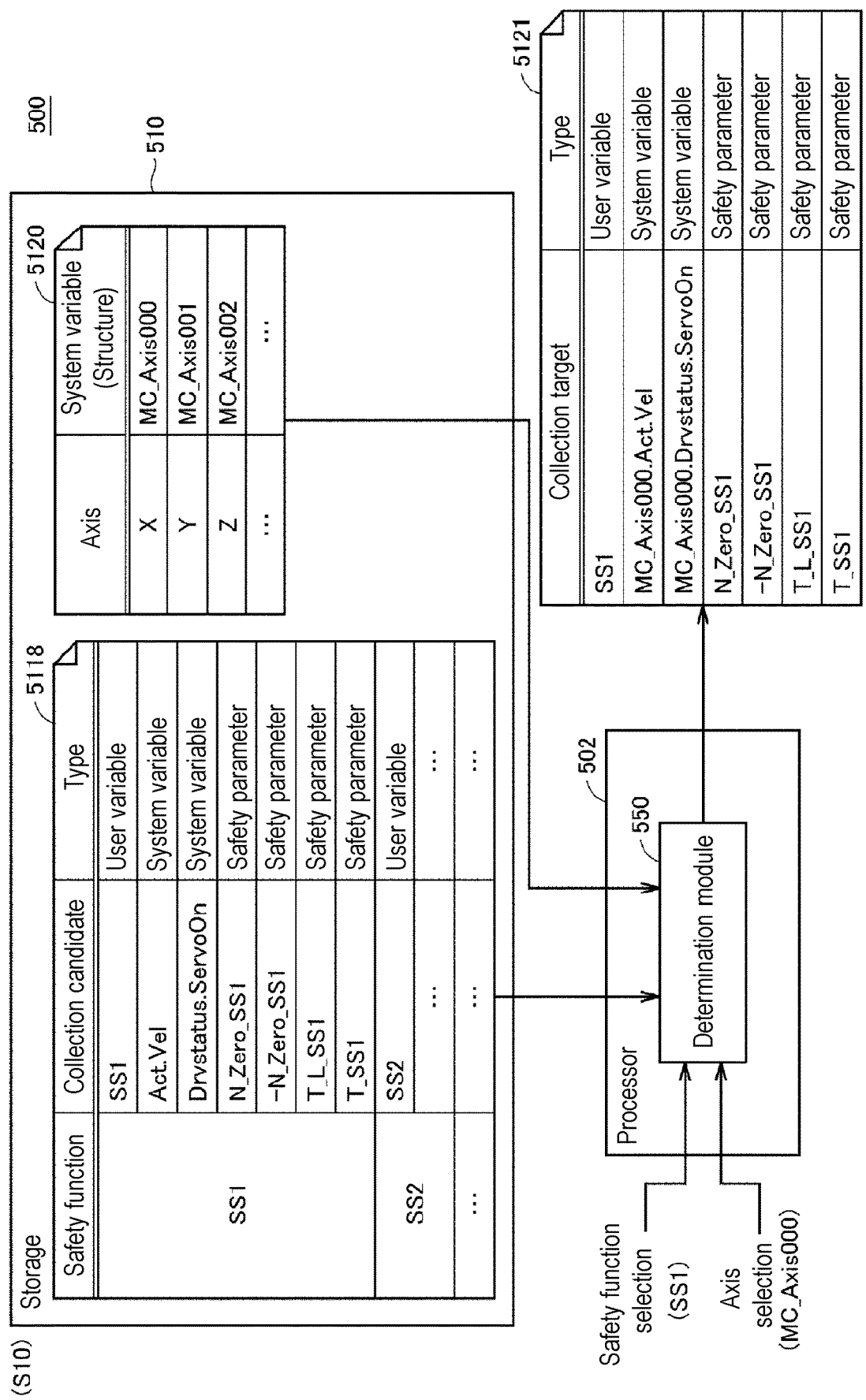
FIG. 17 is a conceptual diagram illustrating an overview of a method for determining the tracing target data group.

Hereinafter, a method for determining a tracing target data group will be described. FIG. 17 is a conceptual diagram illustrating an overview of the method for determining a tracing target data group.

As illustrated in FIG. 17, the support device 500 includes, as hardware configurations, a processor 502 and a storage 510. The processor 502 includes, as a functional configuration, a determination module 550. The storage 510 includes collection candidate information 5118 and axis information 5120.

In the collection candidate information 5118, a data group of collection candidates in the control system 1 is associated with types of safety functions of the safety driver 300. The safety functions defined by the collection candidate information 5118 include, for example, Safe Torque Off(STO), Safe Stop 1 (SS1), Safe Stop 2 (SS2), Safe Operating Stop (SOS), Safe Brake Control (SBC), and the like.

Each data group of the collection candidates defined by the collection candidate information 5118 includes variables to be referred to when the safety functions are executed. In one example, variable associated with the safety function "SS1" include a user variable "SS1" indicating whether or not the safety function "SS1" has been activated, a system variable "Act.Vel" indicating the speed of the servo motor 400, a system variable "Drvstatus.ServoOn" indicating whether or not the servo motor 400 is in an electricity distributed state, and the like.

Also, each data group of the collection candidates defined by the collection candidate information 5118 includes safety parameters referred to when the safety functions are executed. In one example, the safety parameters associated with the safety function "SS1" include "N_Zero_SS1", "−N_Zero_SS1", "T_L_SS1", and "T_SS1".

"N_Zero_SSl" indicates an upper limit value of the state value of the servo motor 400. "−N_Zero_SS1" indicates a lower limit value of the state value of the servo motor 400.

"T_L_SS1" indicates a stop holding period starting from when the state value of the safety driver 300 becomes equal to the upper limit value "N_Zero_SS1" until driving of the servo motor 400 is forcibly stopped. In other words, the state value of the servo motor 400 is required to fall within the range of the upper limit value "N_Zero_SS1" and the lower limit value "−N_Zero_SS1" within the stop holding period "T_L_SS1" in order to satisfy the specification of the safety function "SS1".

"T_SS1" indicates a stop holding period starting from start of execution of the safety function "SS1" until driving of the servo motor 400 is forcibly stopped. In other words, the state value of the servo motor 400 is required to fall within the range of the upper limit value "N_Zero_SS1" and the lower limit value "−N_Zero_SS1" within the stop holding period "T_SS1" in order to satisfy the specification of the safety function "SS1".

The axis information 5120 includes axis setting set for the support device 500. More specifically, the user sets an axis that is a drive target for each servo motor 400 in advance in or before designing of the standard control program 1104. The support device 500 generates a structure corresponding to the set axis as a system variable on the basis of the setting. The user can also describe a program for each axis using the generated structure. The axis information 5120 defines each system variable (structure) generated in the setting of the axis.

The determination module 550 determines a collection target data group on the basis of a combination of the axis selected in the setting region 542 (see FIG. 16) and the safety function selected in the setting region 543 (see FIG. 16). As illustrated in FIG. 17, it is assumed that "MC_Axis000" has been selected in axis selection and "SS1" has been selected in function selection. In this case, the determination module 550 specifies a data group of collection candidates corresponding to the safety function "SS1" with reference to the collection candidate information 5118. The determination module 550 includes the user variable "SS1" and the safety parameters "N_Zero_SS1", "-N_Zero_SS1", and "T_SS1" in the specified data group with no change in the collection target data group 5121. On the other hand, the determination module 550 adds a structure variable name "MC_Axis000" to the system variables "Act.Vel" and "Drvstatus.ServoOn" related to the axis in the specified data group and includes the system variables "MC_Axis000.Act.Vel" and "MC_Axis000.Drvstatus.ServoOn" in the collection target data group 5121.

Referring again to FIG. 16, the collection target data group 5121 determined by the determination module 550 is displayed in the display region 545 on the bulk setting screen 540. If the user presses an OK button B10, the collection target data group 5121 displayed in the display region 545 is reflected to the setting region 533 on the data tracing screen 530. Also, in a case in which the OK button B10 is pressed in a state in which a check box 544 is checked, the tracing condition is automatically reflected to the setting region 531 on the data tracing screen 530. More specifically, different tracing conditions are associated with the type of the safety function in advance, and the tracing conditions corresponding to the selected type of safety function are reflected to the setting region 531 on the data tracing screen 530. For example, it is assumed that the saving ratio "100%" and "falling" of the variable "SS1" are associated as tracing conditions with the safety function "SS1". If the safety function "SS1" is selected in this case, then "100%" is automatically set in the setting region 531D, and "falling" of the variable "SS1" is automatically set in the setting region 531E.

On the other hand, if the user presses a cancellation button B11, the details set on the bulk setting screen 540 are not reflected to the setting region 533 on the data tracing screen 530, and the bulk setting screen 540 is then closed.

(G2. Step S20)

Referring again to FIG. 14, processing in Step S20 will be described. The processing in Step S20 includes processing in Steps S22, S24, and S26.

It is assumed that in Step S22, the user performs a tracing execution operation on the support device 500.

In Step S24, the support device 500 extracts variables from the aforementioned collection target data group set in the setting region 533 on the data tracing screen 530.

In Step S26, the support device 500 outputs, to the standard controller 100, a tracing execution order assuming the extracted variables as collection targets. The tracing execution order includes the aforementioned information set in the setting region 531 on the data tracing screen 530.

(G3. Step S30)

Subsequently, processing in Step S30 will be described with reference to FIG. 14.

In Step S30, the standard controller 100 starts sampling processing on the tracing target data group on the basis of reception of the tracing execution order from the support device 500.

Figure 18:
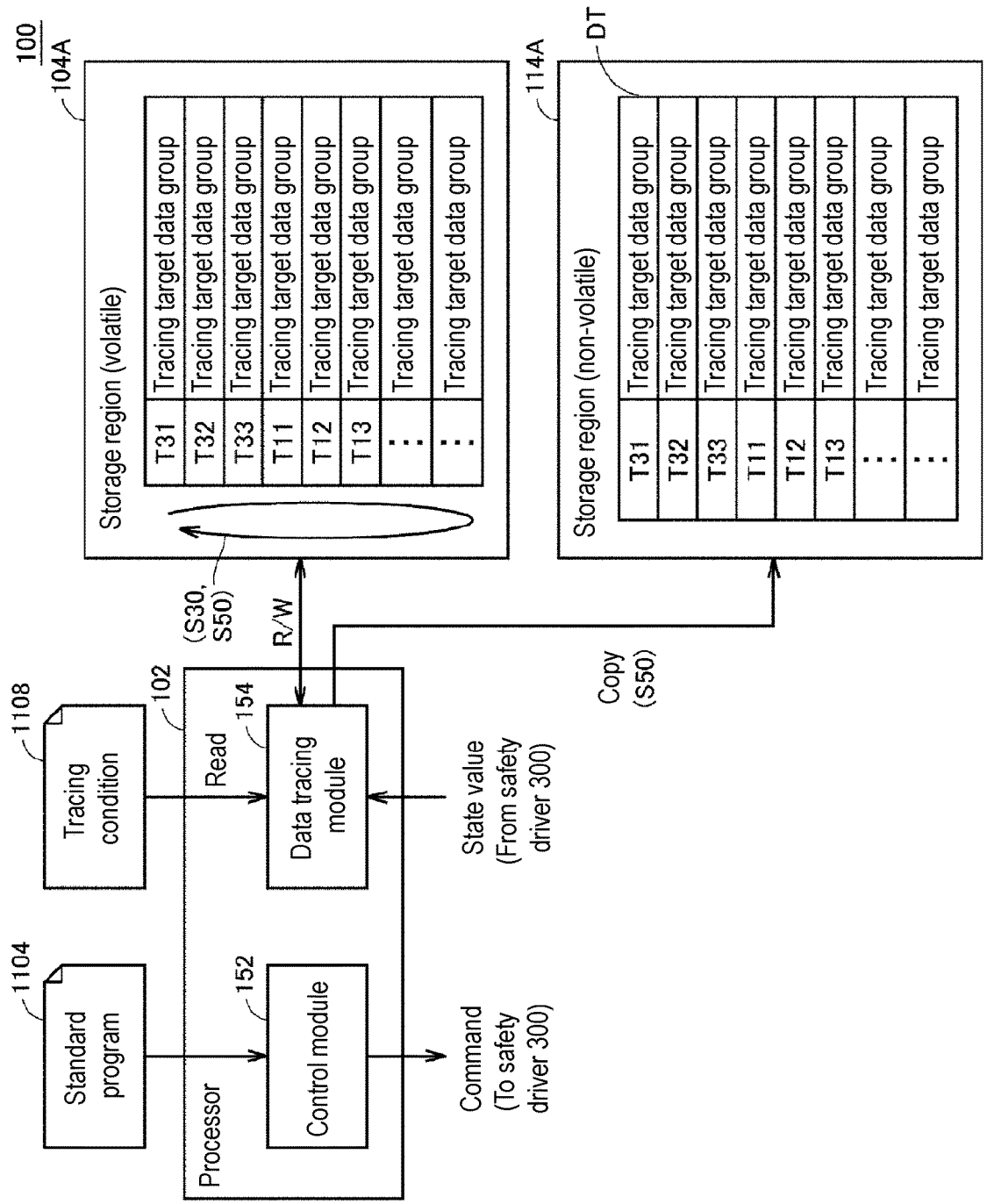
FIG. 18 is a diagram for explaining sampling processing for the tracing target data group.

FIG. 18 is a diagram for explaining the sampling processing of the trace target data group. Referring to FIG. 18, the processor 102 of the standard controller 100 includes, as functional modules, a control module 152 and a data tracing module 154. The control module 152 outputs a command to the safety driver 300 in every cycle defined in advance in accordance with the standard control program 1104. The safety driver 300 controls the servo motor 400 in accordance with the command from the standard controller 100.

The data tracing module 154 samples the tracing target data group in accordance with a tracing condition 1108 set in the aforementioned setting region 531 on the data tracing screen 530. More specifically, the data tracing module 154 receives the tracing target data group from the safety driver 300 in every predefined cycle, associates the data group with clock time information, and then successively writes the data group in the storage region 104A. The storage region 104A is a volatile storage region inside the standard controller 100. The storage region 104A is secured inside the main memory 104 (see FIG. 3), for example. In a case in which the number of times sampling of the tracing target data group is performed reaches a set upper limit value, the data tracing module 154 overwrites the oldest data group from among data groups stored in the storage region 104A with new data group in order.

(G4. Step S40)

Referring again to FIG. 14, processing in Step S40 will be described. The processing in Step S40 includes processing in Steps S42, S44, S46, and S48.

In Step S42, the user performs an input (hereinafter, also referred to as a "trigger input") for satisfying the aforementioned trigger condition set in the setting region 531E on the data tracing screen 530 on the safety device 240. Note that the user may perform the input for satisfying the trigger condition on the support device 500 instead of the safety device 240. In this case, the user can cause the trigger condition to be satisfied by changing the value of the variable related to the trigger condition on the support device 500.

In Step S44, the safety device 240 outputs the trigger input in Step S42 to the safety IO unit 230.

In Step S46, the safety IO unit 230 outputs a signal in accordance with the trigger input received in Step S44 to the safety controller 200.

In Step S48, the safety controller 200 activates the safety function in accordance with the signal received in Step S46. The activation is realized by rewriting the variable indicating ON/OFF of the safety function. In the example in Step S48, the safety function "SS1" is activated by setting the variable "SS1" from ON to OFF.

(G5. Step S50)

Subsequently, processing in Step S50 will be described with reference to FIG. 14.

It is assumed that falling of the variable "SS1" has been set as a trigger condition in aforementioned the setting region 531E on the data tracing screen 530. In this case, the standard controller 100 executes processing of saving the tracing target data group on the basis of the change in variable "SS1" from ON to OFF in Step S50.

Referring to FIG. 18, the saving processing in Step S50 will be described. The data tracing module 154 acquires the aforementioned upper limit value of the number of times sampling is performed set in the setting region 531C on the data tracing screen 530 and the saving ratio set in the setting region 531D and calculates the remaining number of times sampling is performed corresponding to the saving ratio of the number of times sampling is performed. In an example of a case in which the saving ratio is set to 50%, and the upper limit value of the number of times sampling is performed is set to 10,000 times, the standard controller 100 sets the remaining number of times sampling is performed to 5,000 times (=10,000 times×0.5). The data tracing module 154 continues to perform the remaining sampling 5,000 times after the trigger condition is satisfied and then stops the sampling. In this manner, data of the sampling performed 5,000 times before the trigger condition is satisfied and data of the sampling performed 5,000 times after the trigger condition is satisfied remain in the storage region 104A.

Thereafter, the data tracing module 154 copies the data group saved in the volatile storage region 104A to the non-volatile storage region 114A. In this manner, the tracing result DT is saved in the non-volatile storage region 114A. The storage region 114A may be secured inside the storage 110 of the standard controller 100 or may be secured inside the external memory card 114.

(G6. Step S60)

Referring again to FIG. 14, processing in Step S60 will be described. The processing in Step S60 includes processing in Steps S61 to S67.

In Step S61, the support device 500 transmits a request for acquiring the tracing result DT to the standard controller 100.

In Step S62, the standard controller 100 transmits the tracing result DT to the support device 500 on the basis of reception of the request for acquisition.

In Step S63, the support device 500 determines a display target time range on the basis of the acquired tracing result DT. In one example, the support device 500 determines, as a display target time range, from the oldest time information to the latest time information in time information included in the tracing result DT.

In Step S64 the support device 500 extracts safety parameters SP in the aforementioned collection target data group set in the setting region 533 on the data tracing screen 530.

In Step S65, the support device 500 outputs a request for acquiring the extracted safety parameters to the safety driver 300 via the standard controller 100.

In Step S66, the safety driver 300 transmits the safety parameters SP corresponding to the received request for acquisition to the support device 500.

Note that in a case in which the safety parameters that are targets of acquisition are cached in the support device 500 (in the aforementioned project data 510b, for example), the communication in Steps S65 and S66 are not necessarily performed. In this case, the support device 500 uses the cached safety parameters without performing communication with the safety driver 300 in Steps S65 and S66.

In Step S67, the support device 500 displays the tracing result DT received in Step S62 and the safety parameters SP received in Step S66 as a result of executing the data tracing. In this manner, the support device 500 acquires the safety parameters SP included in the collection target data group from the safety driver 300 and acquires the state value tracing result DT included in the collection target data group from the data tracing module 154 of the standard controller 100.

Figure 19:
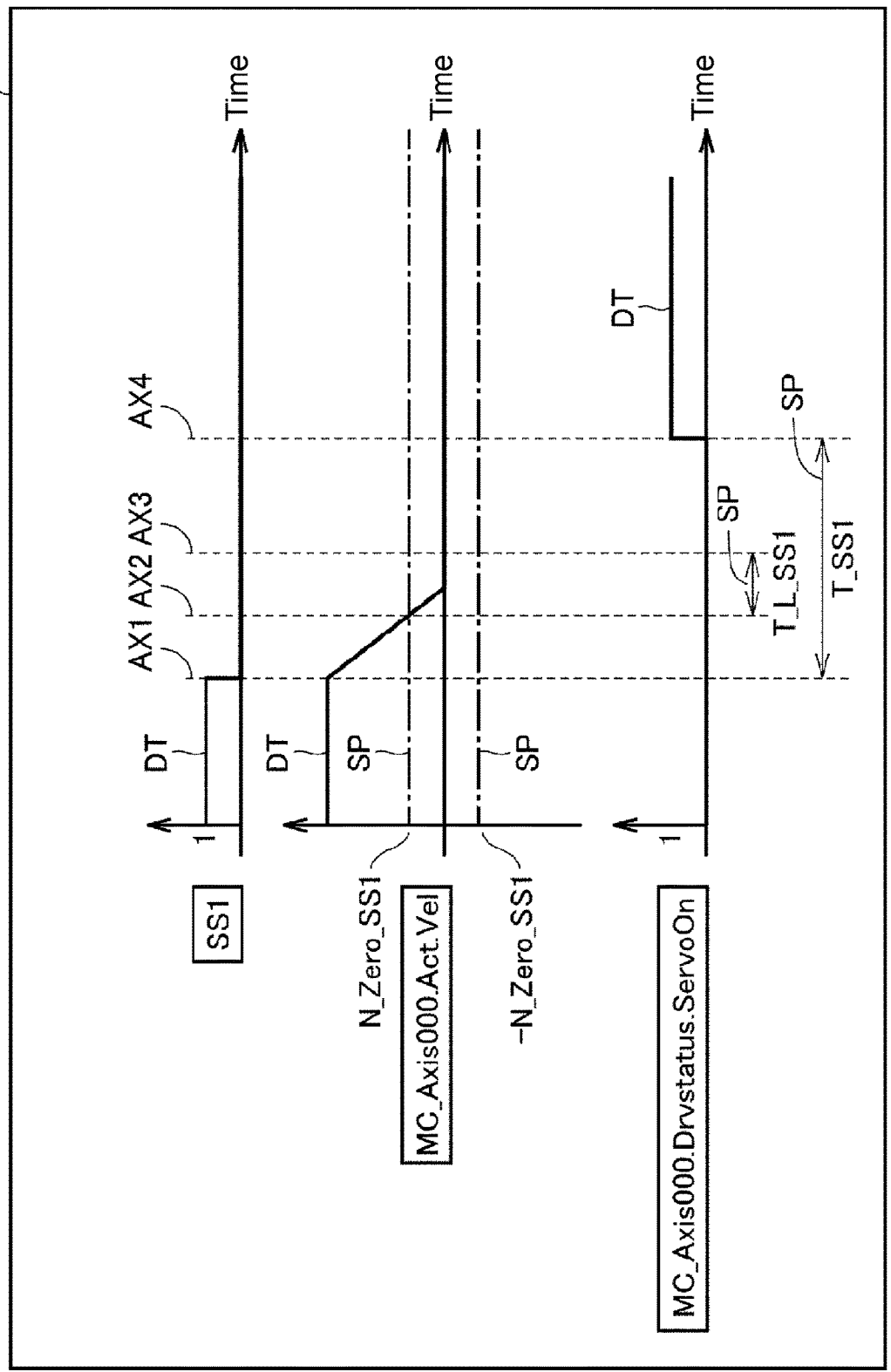
FIG. 19 is a diagram illustrating a display region in a data tracing screen.

Referring to FIG. 19 the display processing in Step S67 will be described in detail. FIG. 19 is a diagram illustrating the display region 535 on the data tracing screen 530 illustrated in FIG. 15.

As illustrated in FIG. 19, the support device 500 displays the tracing result DT on a graph in which the horizontal axis represents a time while the vertical axis represents a magnitude of the state value of the safety driver 300, and also displays the safety parameters SP on the graph. Note that although the horizontal axis of the graph represents a time and the vertical axis of the graph represents the magnitude of the state value in the example in FIG. 19, the horizontal axis of the graph may represent the magnitude of the state value, and the vertical axis of the graph may represent the time.

In the example in FIG. 19, transition of the variable "SS1", transition of the variable "MC_Axis000.Act.Vel", and transition of the variable "MC_Axis000.Drvstatus.ServoOn" are displayed as the tracing result DT. Also, "N_Zero_SS1", "−N_Zero_SS1", "T_SS1", and "T_L_SS1" are displayed as the safety parameters SP.

The safety parameter "N_Zero_SS1" indicates the upper limit value of the state value of the safety driver 300. The safety parameter "−N_Zero_SS1" indicates the lower limit value of the state value of the safety driver 300. The user can easily determine whether or not the state value of the safety driver 300 falls within the range of the upper limit value and the lower limit value through the display of the upper limit value and the lower limit value.

Typically, the support device 500 displays the upper limit value "N_Zero_SS1" and the lower limit value "−N_Zero_SS1" with the upper limit value "N_Zero_SS1" and the lower limit value "−N_Zero_SS1" perpendicularly intersecting the vertical axis of the graph. In this manner, the user can further easily determine whether or not the state value of the safety driver 300 falls within the range of the upper limit value "N_Zero_SS1" and the lower limit value "−N_Zero_SS1". Note that the display form of the upper limit value "N_Zero_SS1" and the lower limit value "−N_Zero_SS1" is not limited to the example in FIG. 19. For example, the upper limit value "N_Zero_SS1" and the lower limit value "−N_Zero_SS1" may simply be displayed as numerical values.

Also, the support device 500 displays vertical axes AX1 to AX4 with the vertical axes AX1 to AX4 superimposed on the tracing result DT. The vertical axis AX1 represents a timing at which the aforementioned trigger condition set in the setting region 531E on the data tracing screen 530 is satisfied. The timing is identical to the timing at which the command for executing the safety function "SS1" is issued. The vertical axis AX1 is displayed such that the vertical axis AX1 perpendicularly intersects the time axis.

The vertical axis AX2 represents a timing at which the state value of the safety driver 300 becomes equal to the upper limit value "N_Zero_SS1". The vertical axis AX2 is displayed such that the vertical axis AX2 perpendicularly intersects the time axis.

The vertical axis AX3 corresponds to a timing after the stop holding period indicated by the safety parameter "T_L_SS1" elapses from the timing indicated by the vertical axis AX2. The vertical axis AX3 is displayed such that the vertical axis AX3 perpendicularly intersects the time axis.

The vertical axis AX4 corresponds to a timing after the stop holding period indicated by the safety parameter "T_SS1" elapses from the timing indicated by the vertical axis AX1. The vertical axis AX4 is displayed such that the vertical axis AX4 perpendicularly intersects the time axis.

Typically, the tracing result DT and the safety parameters SP are displayed with matched units. More specifically, the support device 500 holds in advance a unit conversion table 5122 (see FIG. 6) for unifying the unit of the state value indicated by the tracing result DT and the unit indicated by the safety parameters SP. The support device 500 matches the unit of the state value indicated by the tracing result DT and the unit indicated by the safety parameters SP on the basis of the unit conversion table 5122. The user can easily compare the state value indicated by the tracing result DT with the safety parameters SP through the matched units.

Note that the unit conversion is not necessarily executed by the support device 500 and may be executed by the standard controller 100 or the safety driver 300. In an aspect, the unit conversion table 5122 is stored in the standard controller 100. In this case, the standard controller 100 converts the unit of the tracing result DT to match the unit designated in Step S26 on the basis of the unit conversion table 5122 and transmits the tracing result DT after the unit conversion to the support device 500 in Step S62. In another aspect, the unit conversion table 5122 is stored in the safety driver 300. In this case, the safety driver 300 converts the unit of the safety parameters SP to match the unit designated in Step S65 on the basis of the unit conversion table 5122 and transmits the safety parameters SP after the unit conversion to the support device 500 in Step S66.

H. Modification Examples

Figure 20:
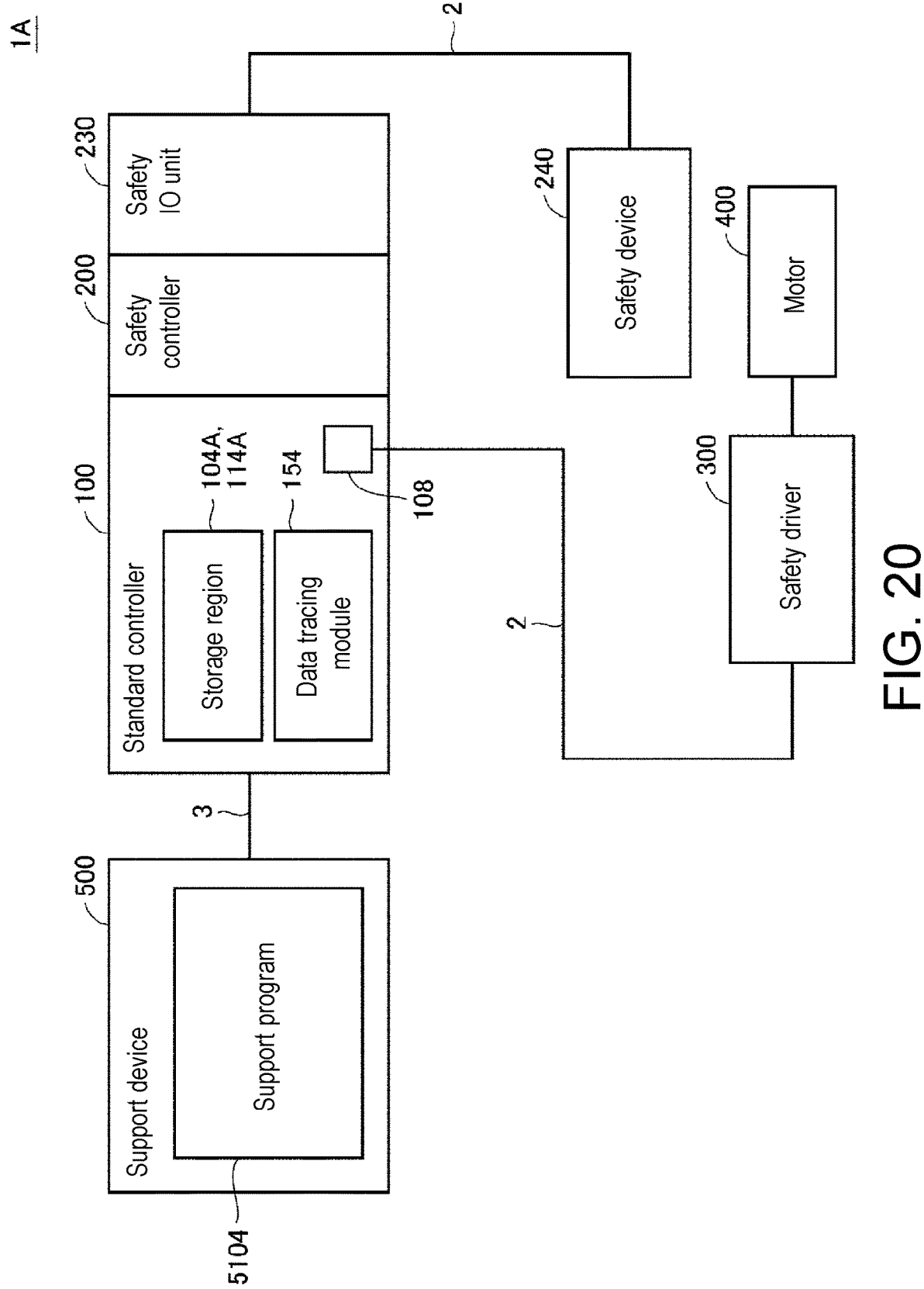
FIG. 20 is a diagram illustrating a control system according to a first modification example.
Figure 21:
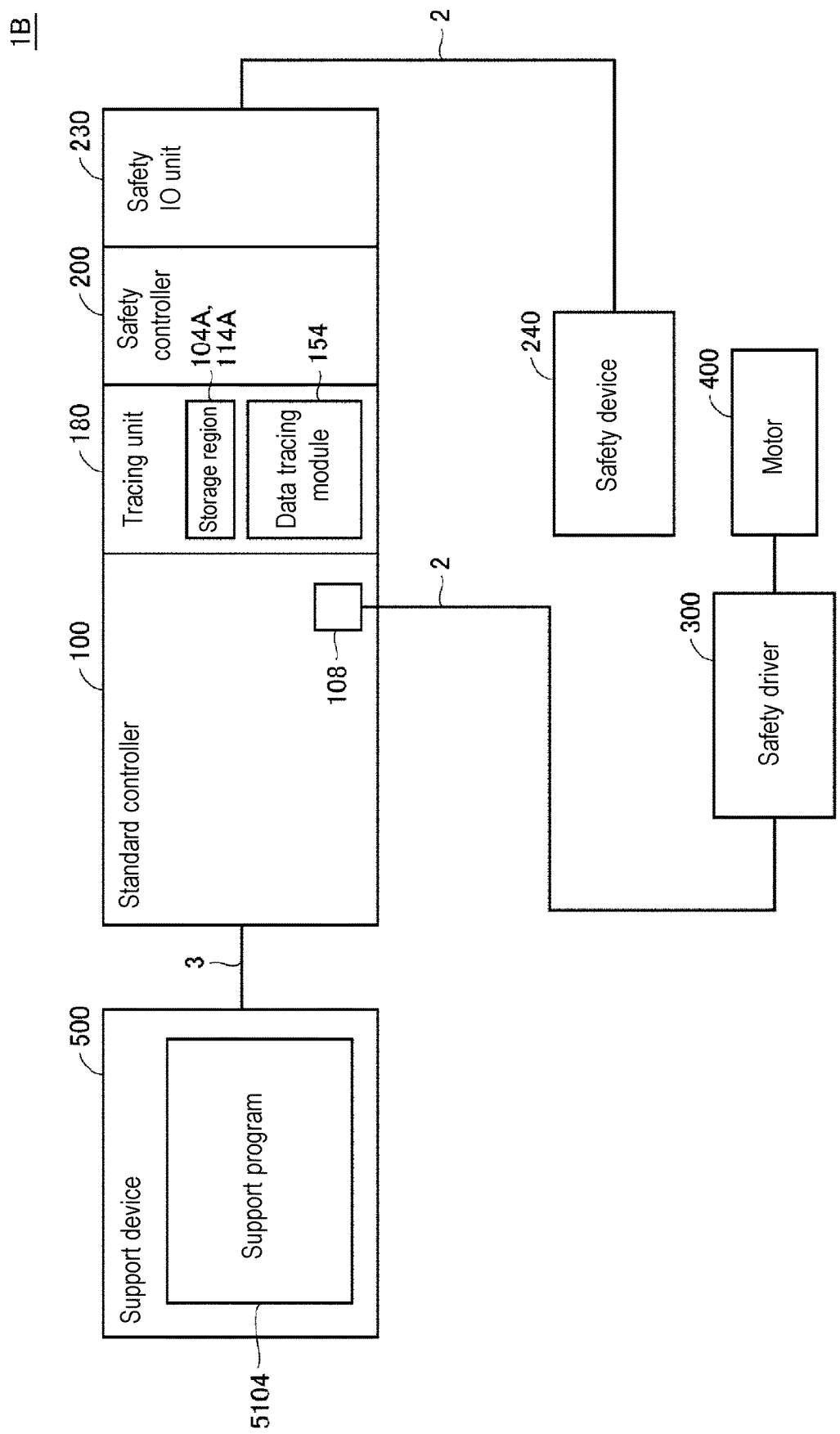
FIG. 21 is a diagram illustrating a control system according to a second modification example.
Figure 22:
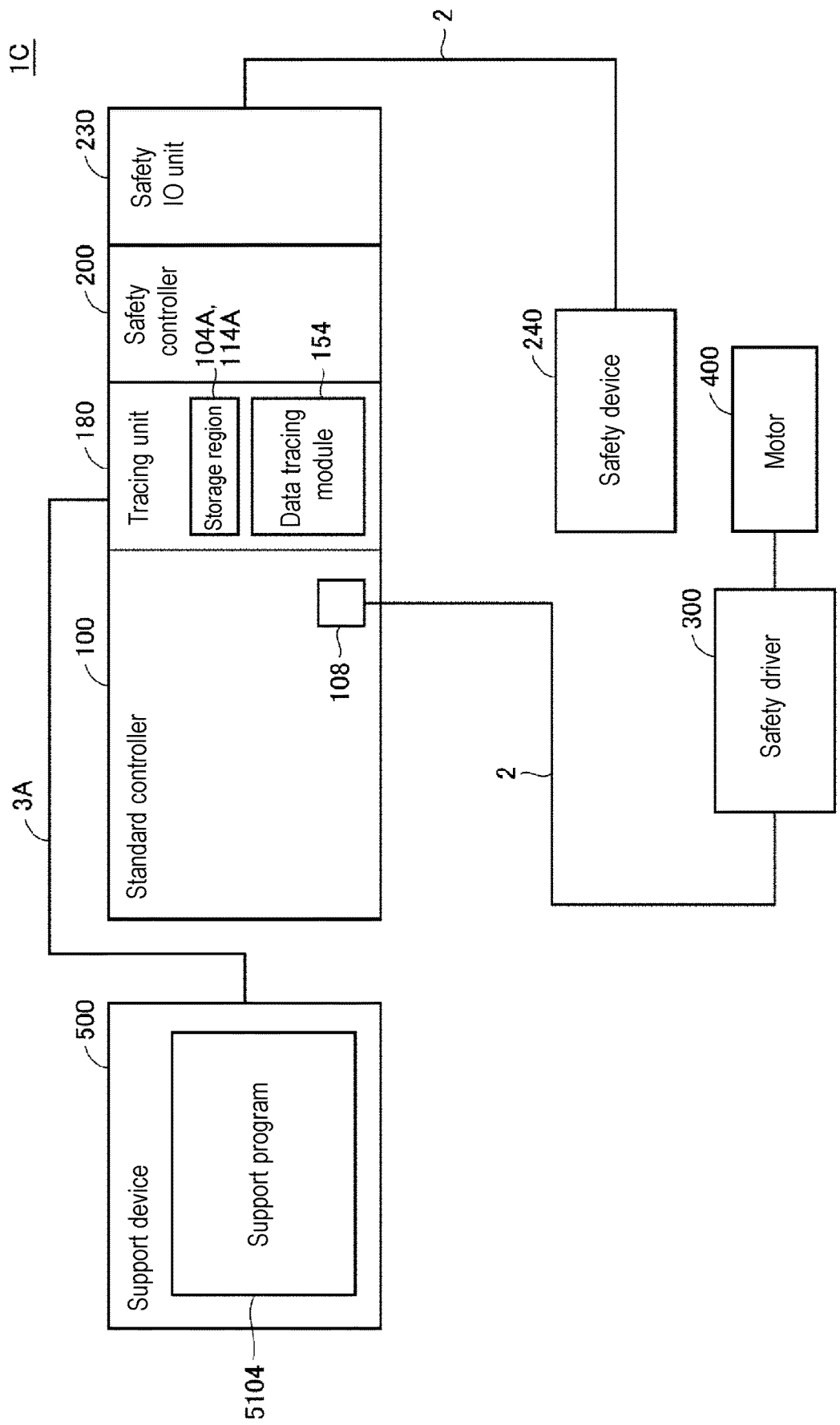
FIG. 22 is a diagram illustrating a control system according to a third modification example.

Referring to FIG. 20 to FIG. 22, modification examples of the control system 1 illustrated in FIG. 1 will be described.

FIG. 20 is a diagram illustrating a control system IA according to a first modification example. In the control system 1 illustrated in FIG. 1, the standard controller 100 and the safety controller 200 are connected via the field network 2. On the other hand, in the control system IA according to the first modification example, the standard controller 100 and the safety controller 200 are connected via an internal bus. Since the other points of the control system 1A are the same as those in the control system 1, description thereof will not be repeated.

FIG. 21 is a diagram illustrating a control system 1B according to a second modification example. In the control system 1 illustrated in FIG. 1, the storage regions 104A and 114A for storing the tracing target data group and the data tracing module 154 are provided inside the standard controller 100. On the other hand, in the control system 1B according to the second modification example, the storage regions 104A and 114A and the data tracing module 154 are provided in a dedicated tracing unit 180. The tracing unit 180 is connected to the standard controller 100, the safety controller 200, and the safety IO unit 230 via an internal bus. Since the other points of the control system 1B are the same as those in the control system 1, description thereof will not be repeated.

FIG. 22 is a diagram illustrating a control system IC according to a third modification example. In the control system 1 illustrated in FIG. 1, the support device 500 is connected to the standard controller 100 via the network 3. On the other hand, in the control system IC according to the third modification example, the support device 500 is connected directly to the tracing unit 180 via a network 3A.

Since the other points of the control system 1C are the same as those in the control system 1, description thereof will not be repeated.

I. Appendix

As described above, the embodiment includes the following disclosures.

[Configuration 1]

A control system including: a first controller (100); a drive device (300) that drives a motor (400) in accordance with a first command from the first controller (100); a second controller (200) that transmits a second command related to an operation of safety functions to the drive device (300); and a data tracing module (154) for tracing a state value indicating an operation state of the motor (400) that changes in accordance with the first command, in which the drive device (300) includes a storage (320) for storing safety parameters related to the safety functions, and a control device (311) that stops driving of the motor (400) on the basis of the state value and the safety parameters in a case in which the second command is received from the second controller (200), and the control system further includes a support device (500) for acquiring a tracing result of the state value obtained by the data tracing module (154) and the safety parameters and displaying the safety parameters with the safety parameters superimposed on the tracing result.

[Configuration 2]

The control system according to Configuration 1, in which the support device (500) displays the safety parameters with the safety parameters superimposed on the tracing result after matching a unit of the state value indicated in the tracing result with a unit of the safety parameters.

[Configuration 3]

The control system according to Configuration 1 or 2, in which the support device (500) displays the tracing result on a graph in which one of a horizontal axis and a vertical axis represents time while the other one of the horizontal axis and the vertical axis represents a magnitude of the state value, and also displays the safety parameters on the graph.

[Configuration 4]

The control system according to Configuration 3, in which the safety parameters include a lower limit value of the state value and an upper limit value of the state value, and the support device (500) displays the lower limit value and the upper limit value on the graph.

[Configuration 5]

The control system according to Configuration 4, in which the support device (500) displays the lower limit value and the upper limit value on the graph with each of the lower limit value and the upper limit value perpendicularly intersecting the vertical axis.

[Configuration 6]

The control system according to any one of Configurations 3 to 5, in which the safety parameters include a stop holding period starting from when the drive device (300) receives the second command until the driving of the motor (400) is stopped, and the support device (500) displays, on the graph, a first timing at which the second command is received and a second timing at which the stop holding period elapses after the first timing.

[Configuration 7]

The control system according to Configuration 6, in which the support device (500) displays the first timing and the second timing on the graph with each of the first timing and the second timing perpendicularly intersecting the horizontal axis.

[Configuration 8]

A support device (500) that is connected to a control system (1), the control system (1) including a first controller (100), a drive device (300) that drives a motor (400) in accordance with a first command from the first controller (100), a second controller (200) that transmits a second command related to an operation of safety functions to the drive device (300), and a data tracing module (154) for tracing a state value indicating an operation state of the motor (400) that varies in accordance with the first command, the drive device (300) including: a storage (320) for storing safety parameters related to the safety functions; and a control device (311) for stopping driving of the motor (400) on the basis of the state value and the safety parameters in a case in which the second command is received from the second controller (200), in which the support device (500) includes a means (S62) for acquiring a tracing result of the state value from the data tracing module (154), a means (S66) for acquiring the safety parameters from the drive device (300), and a means (S67) for displaying the acquired safety parameters with the safety parameters superimposed on the acquired tracing result.

[Configuration 9]

A support program that is executed by a computer connected to a control system (1), the control system (1) including a first controller (100), a drive device (300) that drives a motor (400) in accordance with a first command from the first controller (100), a second controller (200) that transmits a second command related to an operation of safety functions to the drive device (300), and a data tracing module (154) for tracing a state value indicating an operation state of the motor (400) that changes in accordance with the first command, the drive device (300) including a storage (320) for storing safety parameters related to the safety functions, and a control device (311) for stopping driving of the motor (400) on the basis of the state value and the safety parameters in a case in which the second command is received from the second controller (200), the support program causing the computer to execute steps of: (S62) acquiring a tracing result of the state value from the data tracing module (154); (S65) acquiring the safety parameters from the drive device (300); and (S67) displaying the acquired safety parameters with the safety parameters superimposed on the acquired tracing result.

The embodiment disclosed hitherto is just an illustrative example in any sense and has to be considered as not having been described for limitation. The scope of the present invention is indicated by claims rather than the above description and is intended to include all modifications within meanings and the scope equivalent to the claims.

The invention claimed is:

1. A control system comprising:
a first controller;
a drive device that drives a motor in accordance with a first command from the first controller; and
a second controller that transmits a second command related to an operation of safety functions to the drive device,
wherein the first controller traces a state value indicating an operation state of the motor that changes in accordance with the first command,
wherein the drive device comprises:
a memory for storing safety parameters related to the safety functions; and
a first processor for stopping driving of the motor on the basis of the state value and the safety parameters in a case in which the second command is received from the second controller, and
the control system further comprises a support device comprising a second processor for acquiring a tracing result of the state value obtained by the first controller and the safety parameters, and displaying the safety parameters with the safety parameters superimposed on the tracing result to allow determination whether or not the operation of the drive device satisfies specifications of the safety functions,
wherein the safety parameters comprise a lower limit value of the state value and an upper limit of the state value and comprise a stop holding period starting from when the first processor of the drive device receives the second command until the driving of the motor is stopped,
wherein the second processor of the support device displays the tracing result on the graph in which one of a horizontal axis and a vertical axis represents time while the other one of the horizontal axis and the vertical axis represents a magnitude of the state value,
wherein the second processor of the support device displays a first timing at which the second command is issued and a second timing within the stop holding period starting at the first timing on the graph with each of the first timing and the second timing perpendicularly intersecting the horizontal axis, and
wherein the second timing represents a timing at which the state value becomes equal to the upper limit value.

2. The control system according to claim 1, wherein the second processor of the support device displays the safety parameters with the safety parameters superimposed on the tracing result after matching a unit of the state value indicated in the tracing result with a unit of the safety parameters.

3. The control system according to claim 1,
wherein the second processor of the support device displays the lower limit value and the upper limit value on the graph.

4. The control system according to claim 3, wherein the second processor of the support device displays the lower limit value and the upper limit value on the graph with each of the lower limit value and the upper limit value perpendicularly intersecting the vertical axis.

5. The control system according to claim 1,
wherein the second processor of the support device displays the lower limit value and the upper limit value on the graph with each of the lower limit value and the upper limit value perpendicularly intersecting the vertical axis, and
wherein in response to the tracing result of the state value falling within a range of the lower limit value and the upper limit value within the stop holding period, the operation of the drive device is determined to be satisfying the specifications of the safety functions.

6. The control system according to claim 1, the second processor of the support device is further configured to convert a unit of the tracing result or a unit of the safety parameters such that the unit of the tracing result and the unit of the safety parameters are the same.

7. A support device that is connected to a control system, the control system comprising:
a first controller;
a drive device that drives a motor in accordance with a first command from the first controller;

a second controller that transmits a second command related to an operation of safety functions to the drive device, wherein the first controller traces a state value indicating an operation state of the motor that changes in accordance with the first command, the drive device comprising:
- a memory for storing safety parameters related to the safety functions; and
- a first processor for stopping driving of the motor on the basis of the state value and the safety parameters in a case in which the second command is received from the second controller, the support device comprising:
- a second processor, configured to:
  - acquire a tracing result of the state value from the first controller;
  - acquire the safety parameters from the drive device; and
  - display the acquired safety parameters with the safety parameters superimposed on the acquired tracing result to allow determination whether or not the operation of the drive device satisfies specifications of the safety functions, wherein the safety parameters comprise a lower limit value of the state value and an upper limit of the state value and comprise a stop holding period starting from when the first processor of the drive device receives the second command until the driving of the motor is stopped, wherein the second processor of the support device displays the tracing result on the graph in which one of a horizontal axis and a vertical axis represents time while the other one of the horizontal axis and the vertical axis represents a magnitude of the state value, wherein the second processor of the support device displays a first timing at which the second command is issued and a second timing within the stop holding period starting at the first timing on the graph with each of the first timing and the second timing perpendicularly intersecting the horizontal axis, wherein the second timing represents a timing at which the state value becomes equal to the upper limit value.

8. A non-transitory computer readable storage medium, storing a support program that is executed by a computer connected to a control system, the control system comprising:

a first controller;

a drive device that drives a motor in accordance with a first command from the first controller;

a second controller that transmits a second command related to an operation of safety functions to the drive device, wherein the first controller traces a state value indicating an operation state of the motor that changes in accordance with the first command, the drive device comprising:
- a memory for storing safety parameters related to the safety functions; and
- a first processor for stopping driving of the motor on the basis of the state value and the safety parameters in a case in which the second command is received from the second controller, the support program causing the computer to execute steps of:
- acquiring a tracing result of the state value from the first controller,
- acquiring the safety parameters from the drive device; and
- displaying the acquired safety parameters with the safety parameters superimposed on the acquired tracing result to allow determination whether or not the operation of the drive device satisfies specifications of the safety functions, wherein the safety parameters comprise a lower limit value of the state value and an upper limit of the state value and comprise a stop holding period starting from when the first processor of the drive device receives the second command until the driving of the motor is stopped, wherein the acquired tracing result is displayed on the graph in which one of a horizontal axis and a vertical axis represents time while the other one of the horizontal axis and the vertical axis represents a magnitude of the state value, wherein a first timing at which the second command is issued and a second timing within the stop holding period starting at the first timing are displayed on the graph with each of the first timing and the second timing perpendicularly intersecting the horizontal axis, wherein the second timing represents a timing at which the state value becomes equal to the upper limit value.

* * * * *